(12) United States Patent
Sang et al.

(10) Patent No.: US 12,273,476 B2
(45) Date of Patent: Apr. 8, 2025

(54) MOBILE TERMINAL

(71) Applicant: LG ELECTRONICS INC., Seoul (KR)

(72) Inventors: Mangyu Sang, Seoul (KR); Insu Song, Seoul (KR); Minsoo Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 501 days.

(21) Appl. No.: 17/640,789

(22) PCT Filed: Sep. 5, 2019

(86) PCT No.: PCT/KR2019/011450
§ 371 (c)(1),
(2) Date: Mar. 4, 2022

(87) PCT Pub. No.: WO2021/045262
PCT Pub. Date: Mar. 11, 2021

(65) Prior Publication Data
US 2022/0337688 A1    Oct. 20, 2022

(51) Int. Cl.
*H04M 1/02*    (2006.01)

(52) U.S. Cl.
CPC ....... *H04M 1/0268* (2013.01); *H04M 1/0237* (2013.01)

(58) Field of Classification Search
CPC .... G06F 1/1652; G06F 1/1656; G06F 1/1647; G06F 1/1624; G06F 1/163; G09F 9/35;
(Continued)

(56) References Cited

U.S. PATENT DOCUMENTS

2013/0058063 A1   3/2013   O'Brien
2016/0147261 A1*  5/2016   Bohn ............. G06F 1/1652
                                                    455/566
(Continued)

FOREIGN PATENT DOCUMENTS

CN    108259649         7/2018
CN    107995395 B  *   1/2020   ........... H04N 5/2257
(Continued)

OTHER PUBLICATIONS

PCT International Application No. PCT/KR2019/011450, Written Opinion of the International Searching Authority dated Jun. 5, 2020, 18 pages.
(Continued)

*Primary Examiner* — David Q Nguyen
(74) *Attorney, Agent, or Firm* — LEE, HONG, DEGERMAN, KANG & WAIMEY

(57) ABSTRACT

A mobile terminal comprises: a body which comprises a first frame, and a second frame which is coupled so as to be movable in a first direction with respect to the first frame; a roller which is rotatably coupled to the second frame; a flexible display unit which has an image outputted on one surface thereof and comprises a front surface part positioned on the front surface of the body by wrapping around the roller, and a rear surface part positioned in the rear surface direction of the body; a support frame which is coupled to the other surface of the flexible display unit and comprises a flexible rack gear formed on the other surface thereof; and an auxiliary drive unit which comprises a pinion gear rotating by engaging with the flexible rack gear, wherein the auxiliary drive unit transfers force to the flexible rack gear in the direction in which the area of the rear surface part increases. The mobile terminal enables the flexible display
(Continued)

unit to also move stably in accordance with the movement of the second frame.

16 Claims, 12 Drawing Sheets

(58) Field of Classification Search
CPC .............. G09F 9/301; H04M 1/0237; H04M 1/0268; G09G 3/001; G09G 2380/02; G04G 17/045; G04C 3/008
USPC ..................................... 455/566, 345, 158.4
See application file for complete search history.

(56) References Cited

U.S. PATENT DOCUMENTS

| 2019/0037716 A1 | 1/2019 | Kim et al. |
| 2020/0363841 A1 | 11/2020 | Kim et al. |
| 2021/0044683 A1 | 2/2021 | He et al. |

FOREIGN PATENT DOCUMENTS

| KR | 1020190077107 | 7/2013 | |
| KR | 1020150007275 | 1/2015 | |
| KR | 1020160129669 | 11/2016 | |
| KR | 1020170081559 | 7/2017 | |
| KR | 1020170089664 | 8/2017 | |
| KR | 1020190013001 | 2/2019 | |
| KR | 1020190062855 | 6/2019 | |
| WO | WO-2016203321 A2 * | 12/2016 | ............. G04C 3/008 |

OTHER PUBLICATIONS

Korean Intellectual Property Office Application No. 10-2022-7006923, Notice of Allowance dated Nov. 27, 2023, 6 pages.
European Patent Office Application Serial No. 19944318.5, Search Report dated May 3, 2023, 8 pages.

* cited by examiner (a)

(b)

(a)

(b)

(a)  (b)

MOBILE TERMINAL

CROSS-REFERENCE TO RELATED APPLICATIONS

This application is the National Stage filing under 35 U.S.C. 371 of International Application No. PCT/KR2019/011450, filed on Sep. 5, 2019, the contents of which are all incorporated by reference herein in its entirety.

TECHNICAL FIELD

The present disclosure relates to a mobile terminal that has a flexible display and is capable of changing the size thereof.

BACKGROUND ART

Terminals may be generally classified as mobile/portable terminals or stationary terminals according to their mobility. Mobile terminals may also be classified as handheld terminals or vehicle mounted terminals according to whether or not a user can directly carry the terminal.

A display device is a device having a function of receiving, processing, and displaying a video that a user may watch. For example, the display device receives a broadcast selected by the user from broadcast signals transmitted from a broadcasting station, separates a video signal from the received signals, and displays the separated video signal on a display.

In recent years, because of a development of a broadcasting technology and a network technology, functions of the display device have also been considerably diversified, and a performance of the device has been improved accordingly. That is, the display device has been developed to provide not only broadcast contents but also various other contents to the user. For example, the display device may provide game play, music listening, internet shopping, user customized information, and the like using various applications as well as programs received from the broadcasting station. In order to perform such extended functions, the display device may be basically connected to other devices or networks using various communication protocols, and may provide the user with an ubiquitous computing environment. In other words, the display device has evolved into a smart device that enables connectivity to a network and continuous computing.

Meanwhile, recently, a flexible display having elasticity sufficient to enable major deformation thereof has been developed. The size of the mobile terminal may be varied by using the deformable property of the flexible display. In a mobile terminal having a structure that is variable in size, changes in the structure of the mobile terminal must be made reliably. However, in such a mobile terminal, a supporting structure or others for a variable display unit may be problematic.

DISCLOSURE

Technical Task

An object of the present disclosure is to provide a mobile terminal having a structure that assists sliding movement.

Technical Solutions

In the present disclosure, provided is a mobile terminal including a body including a first frame, and a second frame coupled to the first frame so as to be movable in a first direction with respect to the first frame, a roller rotatably coupled to the second frame, a flexible display unit divided, by being rolled around the roller, into a front portion located on a front surface of the body and a rear portion located on a rear surface of the body and configured to output an image on one surface thereof, a support frame coupled to another surface of the flexible display unit and including a flexible rack gear formed on another surface of the support frame, and an auxiliary driving unit including a pinion gear that rotates by being meshed with the flexible rack gear, wherein the auxiliary driving unit may transfer force to the flexible rack gear in the direction such that the size of an area of the flexible display unit that is located on the rear surface increases.

The mobile terminal may further include a driving unit configured to move the second frame in the first direction or in a second direction, which is opposite the first direction, with respect to the first frame.

The flexible rack gear may include a plurality of grooves extending in a third direction, which is perpendicular to the first direction, and arranged side by side in the first direction.

The support frame may include a plurality of rigid bars extending in a third direction, which is perpendicular to the first direction, and arranged side by side in the first direction, and a flexible portion connecting the rigid bars.

The flexible display unit may include a variable portion positioned on the front surface of the body or on the rear surface of the body depending on the position of the second frame, and the support frame may be located on another surface of the variable portion of the flexible display unit.

The auxiliary driving unit may further include a motor coupled to the second frame and configured to provide rotational force to the pinion gear.

The pinion gear may rotate in a first rotational direction when the second frame moves in the first direction, and the motor may rotate the pinion gear in a second rotational direction, which is opposite the first rotational direction, when the second frame moves in a second direction.

When the second frame finishes moving in the first direction, the motor may rotate the pinion gear by a predetermined angle in the second rotational direction, which is opposite the first rotational direction, so as to provide tensile force to the flexible display unit in the first direction.

The pinion gear may be formed on the outer circumferential surface of the roller.

The roller may include a first portion on which the pinion gear is formed, a second portion in the shape of a pipe having a hollow formed therein, and a first fastening portion, which is formed in the hollow, placed at an end of the first portion, and exposed outside. The auxiliary driving unit may include an elastic part having one end thereof coupled to the first fastening portion and having another end thereof coupled to a second fastening portion provided on the second frame.

The second fastening portion may have one side thereof coupled to the other end of the elastic part and located in the hollow in the second portion, and another side thereof fastened to the second frame using a screw.

The elastic part may include a coil spring.

The roller may further include an opening, which is formed in an outer circumferential surface of the second portion and exposes the first fastening portion.

The second portion may be provided on each of opposite sides of the first portion.

Advantageous Effects

A mobile terminal of the present disclosure may stably move a flexible display unit according to the movement of a second frame.

In addition, due to the tensile force provided to the flexible display unit, the flexible display unit may remain flat without lifting, and may remain in close contact with the body of the mobile terminal.

Further scope of applicability of the present disclosure will become apparent from the detailed description given hereinafter. However, it should be understood that the detailed description and specific examples, while indicating preferred embodiments of the disclosure, are given by illustration only, since various changes and modifications within the spirit and scope of the disclosure will become apparent to those skilled in the art from this detailed description.

BEST MODE FOR DISCLOSURE

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be directly connected with the other element or intervening elements may also be present. In contrast, when an element is referred to as being "directly connected with" another element, there are no intervening elements present.

A singular representation may include a plural representation unless it represents a definitely different meaning from the context.

Terms such as "include" or "has" are used herein and should be understood that they are intended to indicate an existence of several components, functions or steps, disclosed in the specification, and it is also understood that greater or fewer components, functions, or steps may likewise be utilized.

Figure 1:
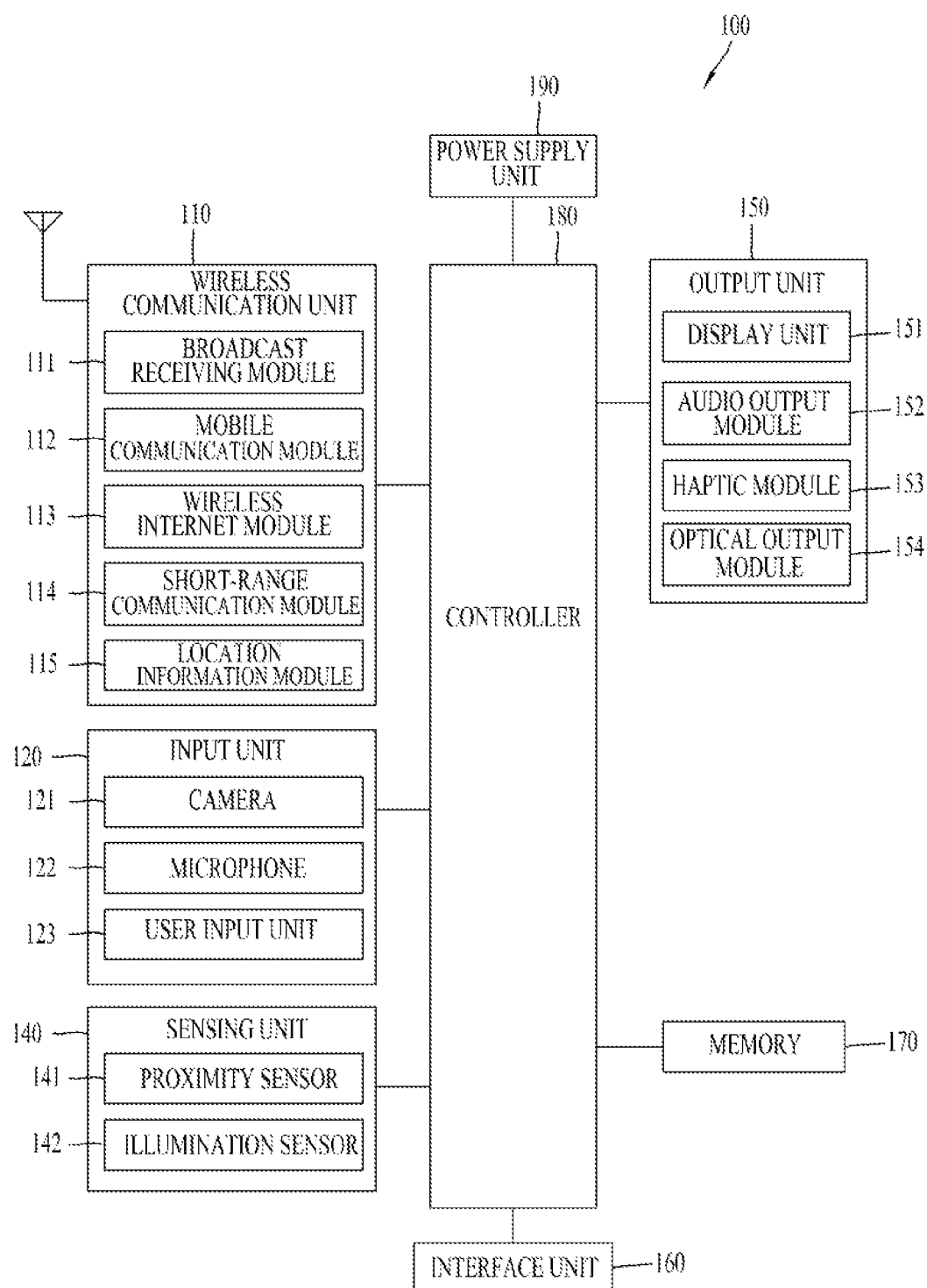
FIG. 1 is a block diagram of a mobile terminal in accordance with the present disclosure.

FIG. 1 is a block diagram of a mobile terminal in accordance with the present disclosure.

The mobile terminal 100 is shown having components such as a wireless communication unit 110, an input unit 120, a sensing unit 140, an output unit 150, an interface unit 160, a memory 170, a controller 180, and a power supply unit 190. It is understood that implementing all of the illustrated components in FIG. 1A is not a requirement, and that greater or fewer components may alternatively be implemented than the components listed above.

More specifically, the wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 typically includes one or more modules which connect the mobile terminal 100 to one or more networks.

To facilitate such communications, the wireless communication unit 110 includes one or more of a broadcast receiving module 111, a mobile communication module 112, a wireless Internet module 113, a short-range communication module 114, and a location information module 115.

Regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE), LTE-A (Long Term Evolution-Advanced), and the like).

Examples of wireless signals transmitted and/or received via the mobile communication module 112 include audio call signals, video (telephony) call signals, or various formats of data to support communication of text and multimedia messages.

The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution-Advanced), and the like. The wireless Internet module 113 may transmit/receive data according to one or more of such wireless Internet technologies, and other Internet technologies as well.

In some embodiments, when the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

The location information module 115 is generally configured to detect, calculate, derive or otherwise identify a position of the mobile terminal. As an example, the location information module 115 includes a Global Position System (GPS) module, a Wi-Fi module, or both. If desired, the location information module 115 may alternatively or additionally function with any of the other modules of the wireless communication unit 110 to obtain data related to the position of the mobile terminal. As one example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed as a user's control command.

Such cameras 121 may process image frames of still pictures or video obtained by image sensors in a video or image capture mode. The processed image frames can be displayed on the display unit 151 or stored in memory 170. In some cases, the cameras 121 may be arranged in a matrix configuration to permit a plurality of images having various angles or focal points to be input to the mobile terminal 100. As another example, the cameras 121 may be located in a stereoscopic arrangement to acquire left and right images for implementing a stereoscopic image.

The microphone 122 is generally implemented to permit audio input to the mobile terminal 100. The audio input can be processed in various manners according to a function being executed in the mobile terminal 100. If desired, the microphone 122 may include assorted noise removing algorithms to remove unwanted noise generated in the course of receiving the external audio.

The user input unit 123 is a component that permits input by a user. Such user input may enable the controller 180 to control operation of the mobile terminal 100. The user input unit 123 may include one or more of a mechanical input element (for example, a key, a button located on a front and/or rear surface or a side surface of the mobile terminal 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the mobile terminal at a location that is other than the touch screen. On the other hand, the virtual key or the visual key may be displayed on the touch screen in various shapes, for example, graphic, text, icon, video, or a combination thereof.

The sensing unit 140 is typically implemented using one or more sensors configured to sense internal information of the mobile terminal, the surrounding environment of the mobile terminal, user information, and the like. For example, the sensing unit 140 may alternatively or additionally include other types of sensors or devices, such as a proximity sensor 141 and an illumination sensor 142, a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154. The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 may provide or process information or functions appropriate for a user by processing signals, data, information and the like, which are input or output, or activating application programs stored in the memory 170.

To drive the application programs stored in the memory 170, the controller 180 may be implemented to control a predetermined number of the components mentioned above in reference with FIG. 1A. Moreover, the controller 180 may be implemented to combinedly operate two or more of the components provided in the mobile terminal 100 to drive the application programs.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

Some or more of the components may be operated cooperatively to embody an operation, control or a control method of the mobile terminal in accordance with embodiments of the present disclosure. Also, the operation, control or control method of the mobile terminal may be realized on the mobile terminal by driving of one or more application problems stored in the memory 170

Figure 2:
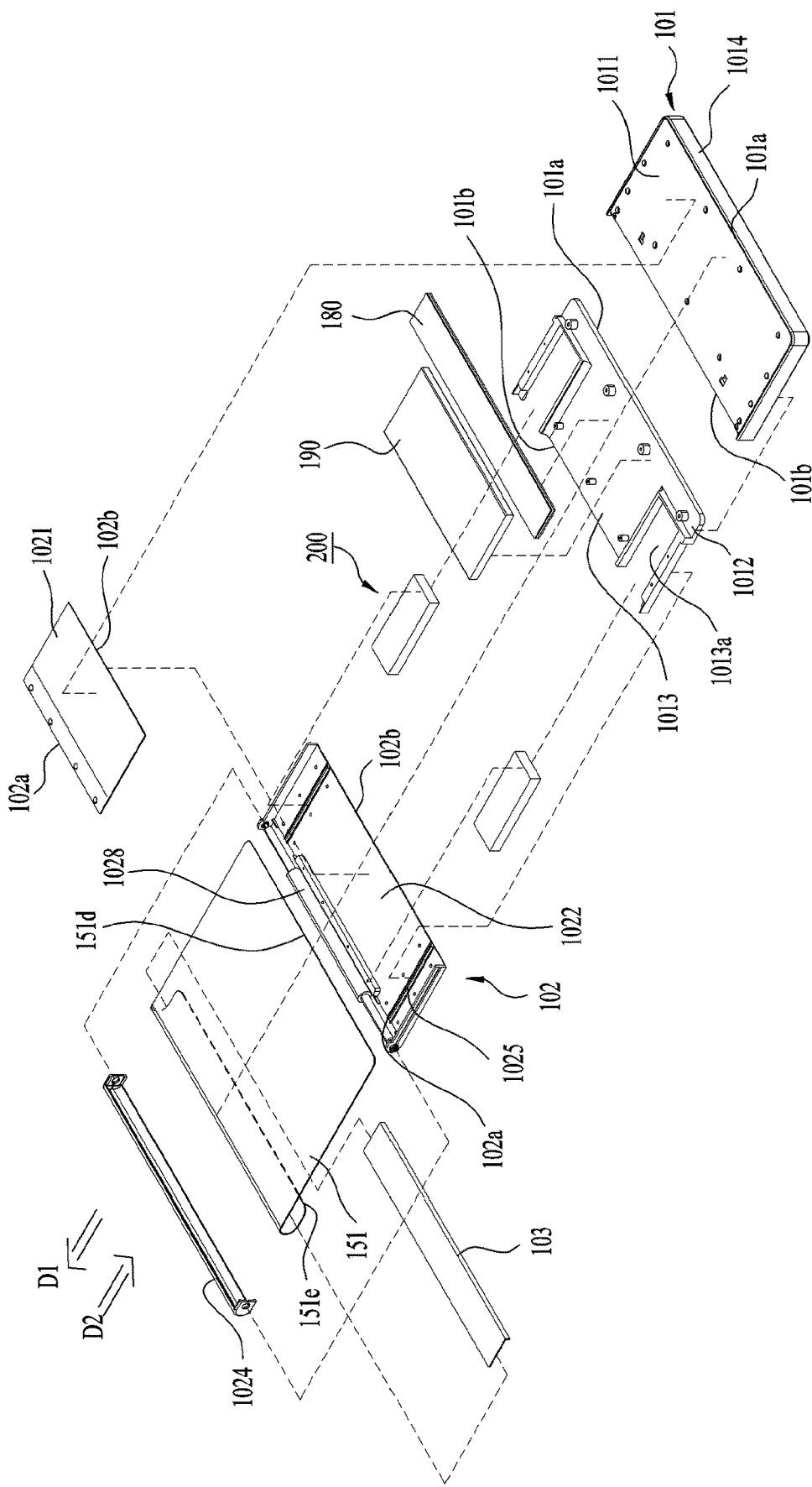
FIG. 2 is an exploded perspective view of a mobile terminal according to one embodiment.
Figure 3:
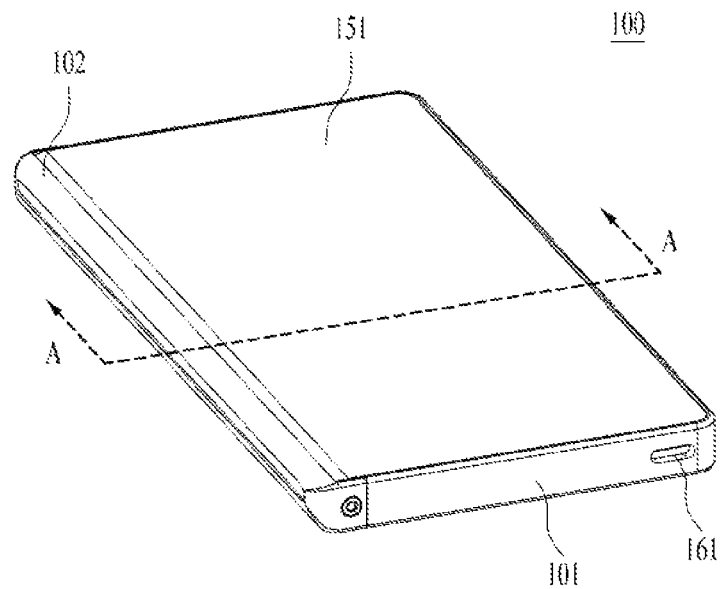
FIG. 3 shows perspective views respectively illustrating a first state and a second state viewed from one side of a mobile terminal according to one embodiment.
Figure 3:
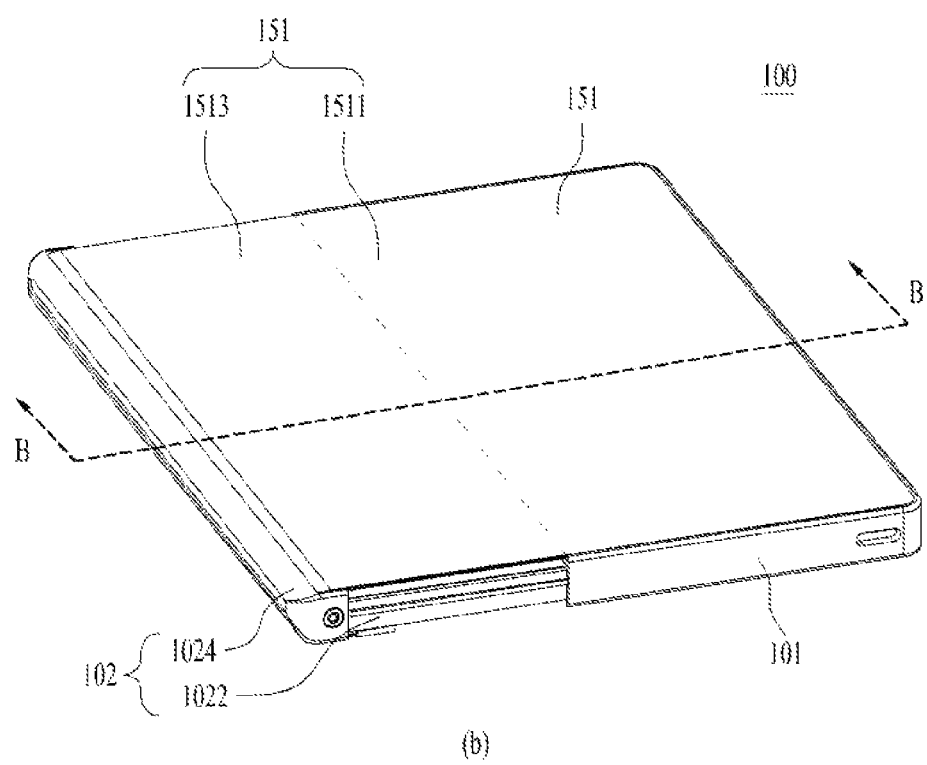
Figure 4:
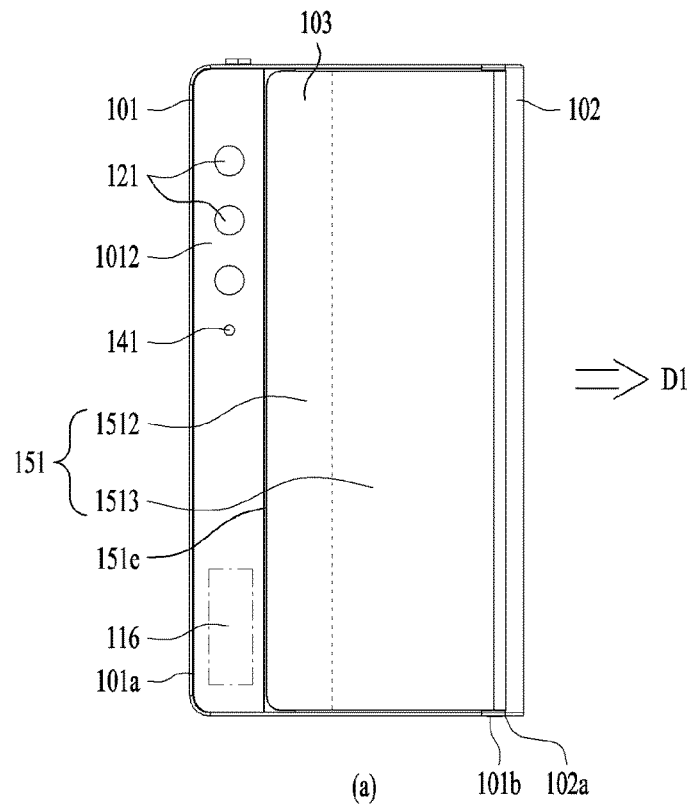
FIG. 4 shows rear face views respectively illustrating a first state and a second state of a mobile terminal according to one embodiment.
Figure 4:
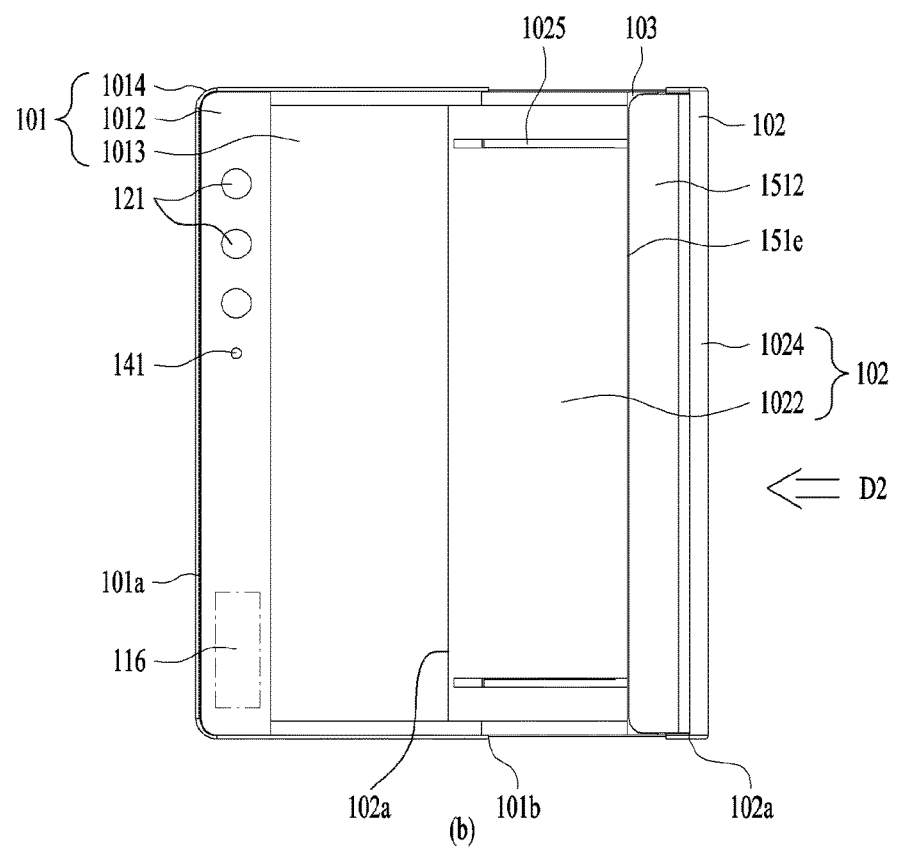
Figure 5:
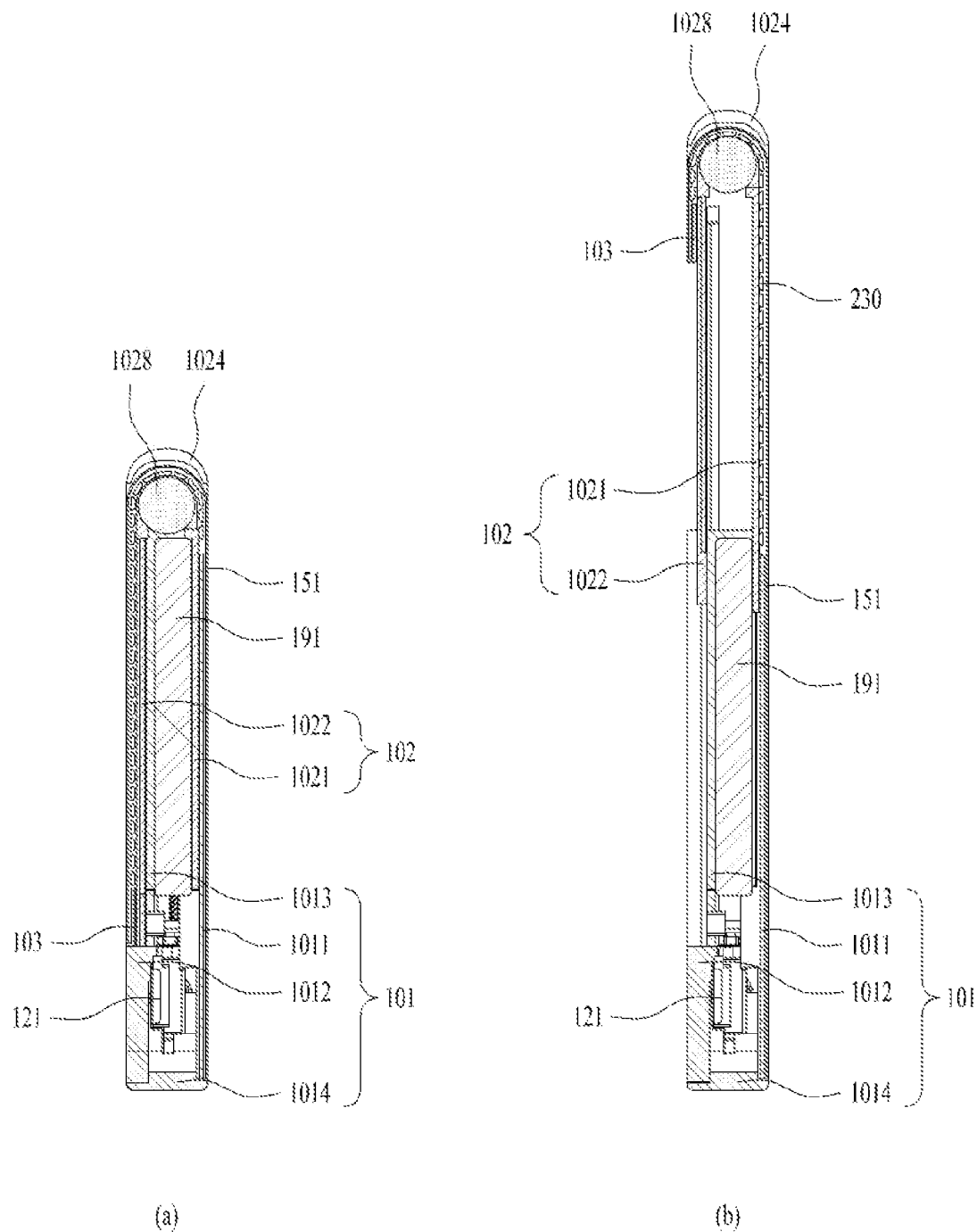
FIG. 5 shows cross-sectional views respectively taken along a line A-A and a line B-B of FIG. 3.

FIG. 2 is an exploded perspective view illustrating a mobile terminal according to the present disclosure. FIG. 3 is a perspective view illustrating first and second states of a mobile terminal viewed in one lateral side. FIG. 4 is a rear view illustrating first and second states of a mobile terminal. FIG. 5 is a sectional view illustrating first and second states of a mobile terminal, obtained along the cutting lines A-A and B-B of FIG. 2, respectively. In the above drawings, FIG. 3(a), FIG. 4 (a) and FIG. 5 (a) illustrate a first state of a mobile terminal and FIG. 3(b), FIG. 4 (b) and FIG. 5 (b) illustrates a second state of the mobile terminal.

As illustrated in the drawings, a mobile terminal 100 of a first state is contracted (or retracted) and has a size smaller than that of the mobile terminal 100 of a second state. Moreover, a size of a display 151 located on a front surface of the mobile terminal 100 becomes smaller than that in a second state. On the other hand, the mobile terminal 100 of the first state is extended in a first direction D1 so as to switch to the second state. In the second state, a size of the mobile terminal 100 and a size of the display 151 located on the front surface become greater than those of the first state. In the following description, a direction in which the mobile terminal 100 and the display 151 thereof are extended (or enlarged) is referred to as a first direction D1, a direction in which the mobile terminal 100 and the display 151 thereof are contracted (or retracted) or reduced is referred to as a second direction D2, and a direction vertical to the first and second directions D1 and D2 is referred to as a third direction.

The mobile terminal 100 of the present disclosure may switch from the first state in which the display 151 is located on the front surface like a bar-type mobile terminal like FIG. 3 (a) to the second state by extending the screen like FIG. 3 (b). In the second state, a size of the display 151 located on the front surface is enlarged and a size of the display 151 located on a rear surface is reduced like FIG. 4 (b). Namely, the display 151 used to be located on the rear surface of the mobile terminal 100 in the first state is moved to the front surface of the mobile terminal 100 in the second state.

Thus, in order for a position of the display to be variable, the display may employ a flexible display unit 151. A flexible display means a display that is light-weighted, easily-unbreakable and heavy-duty display fabricated on a thin and flexible substrate capable of curving, bending, folding, twisting and rolling-up like a paper by maintaining the properties of the existing flat panel display.

Moreover, an electronic paper employs a display technology provided with the features of the normal ink and may differ from the existing flat panel display in using reflective light. The electronic paper may change information by electrophoresis using twist balls or capsules.

In a state that the flexible display unit 151 is not deformed (e.g., a state having an infinite curvature radius: hereinafter a basic state), a display region of the flexible display unit 151 becomes a plane. In a state deformed from the basic state by an external force (e.g., a state having a finite curvature radius: hereinafter a deformed state), the display region may become a curved surface. As illustrated in the drawing, information displayed in the deformed state may become visual information outputted to the curved surface. Such visual information is implemented in a manner that light emittance of subpixels deployed in a matrix form is controlled independently. The subpixel means a minimum unit for implementing a single color.

The flexible display unit 151 may lie not in a flat state but in a curved state (e.g., a top-bottom or right-left curved state) from the basic state. In this case, if an external force is applied to the flexible display unit 151, the flexible display unit 151 may be deformed into a flat state (or a less-curved state) or a more-curved state.

Meanwhile, the flexible display unit 151 may implement a flexible touchscreen by being combined with a touch sensor. If a touch is applied to the flexible touchscreen, the controller 180 (see FIG. 1) may perform a control in response to such a touch input. The flexible touchscreen may be configured to sense a touch input in the deformed state as well as in the basic state.

The touch sensor senses a touch (or a touch input) applied to the touchscreen using at least one of various touch types such as a resistance layer type, an electrostatic capacitance type, an infrared type, an ultrasonic type, etc.

For example, a touch sensor may be configured to convert a pressure applied to a specific portion of a touchscreen or a variation of electrostatic capacitance generated from the specific portion into an electric input signal. A touch sensor may be configured to detect a position or size of the touch sensor touched by a touch target applying a touch to a touchscreen, a pressure of the touch, an electrostatic capacitance of the touch, etc.

Meanwhile, a deformation sensing means for sensing deformation of the flexible display unit 151 may be provided to the mobile terminal 100. Such a deformation sensing means may be included in the sensing unit 140 (see FIG. 1).

The deformation sensing means is provided to the flexible display unit 151 or the case (or housing) (i.e., first to third frame 101 to 103 described later), thereby sensing information related to deformation of the flexible display unit 151. Here, the information related to the deformation includes a deformed direction of the flexible display unit 151, a deformed extent, a deformed position, a deformed time, a restored acceleration of the deformed flexible display unit 151, etc., and may further various kinds of information sensible as the flexible display unit 151 is curved.

Based on the information related to the deformation of the flexible display unit 151 and sensed by the deformation sensing means, the controller 180 may change information displayed on the flexible display unit 151 or generate a control signal for controlling a function of the mobile terminal 100.

The size changes of the display unit 151 on the front and rear surfaces of the mobile terminal according to the state switching (first or second state) of the flexible display unit 151, i.e., the size change of the mobile terminal 100 may be performed manually by a force applied by a user, which is non-limited by the manual way. For example, when the mobile terminal 100 or the flexible display unit 151 is in the first state, it may be deformed into the second state by a command of a user or application without an external force applied by the user. Thus, in order for the flexible display unit 151 to be automatically deformed without such an external force, the mobile terminal 100 may include a driving unit 200 described later.

The flexible display unit 151 of the present disclosure is rolled round a predetermined one of both side parts of the mobile terminal 100, thereby being folded at 180°. Hence, one portion of the display unit 151 is disposed on the front surface of the mobile terminal 100 with reference to such a side part, while the rest is disposed on the rear surface of the mobile terminal 100. Some portion of the display unit 151 located on the front surface of the mobile terminal 100 may be fixed to the front surface not to move, while the rest of the display unit 151 located on the rear surface of the mobile terminal 100 may be provided to be movable on the rear surface.

The display unit 151 may be rolled or unrolled round the side part, whereby a size of the region disposed on the front surface of the mobile terminal 100 may be adjusted by moving a part of the display unit 151 disposed on the rear surface of the mobile terminal 100. Since a size of the flexible display unit 151 is determined and the flexible display unit 151 includes a single continuous body, if a size of the flexible display unit 151 located on the front surface of the mobile terminal 100 is increased, a size of the flexible display unit 151 located on the rear surface of the mobile terminal 100 is decreased. The above-configured display unit 151 may be rolled within the second frame 102 relatively movable to the first frame 101, which will be described later, and more specifically, around a predetermined side part of the second frame 102, and withdrawn (or pulled out) from or inserted (or pushed) into the second frame 102 by being rolled around the second frame 102 along a moving direction of the second frame 102 to adjust the size of the display unit 151 on the front surface of the mobile terminal 100. Such an operation will be described in detail together with other related components of the mobile terminal 100.

Typically, an antenna is disposed in the case or the housing of the mobile terminal 100, but a portion where the antenna is installed in the case or the housing may be limited because of the flexible display unit 151 that covers not only the front face of the mobile terminal 100 but also the rear face thereof. For this reason, the antenna may be implemented on the flexible display unit 151. An antenna on display (AOD) is an antenna in which a transparent film is formed by stacking an electrode layer and a dielectric layer that have patterns engraved thereon, respectively. The antenna on display may be implemented thinner than an antenna implemented using a laser direct structuring (LDS) technology using a conventional copper nickel plating scheme, so that the antenna on display may not be exposed to the outside without affecting a thickness. In addition, the antenna on display may transmit and receive a signal directly to or from the display unit 151. Accordingly, the antenna on display may be used in the mobile terminal 100 in which the display unit 151 is located on the both faces of the mobile terminal 100 as in the present disclosure.

With reference to FIGS. 2 to 5, a detailed configuration of the mobile terminal 100 of the present disclosure will be described in detail below. A following description will be achieved basically with reference to FIG. 2 illustrating an overall configuration. FIGS. 3 to 5 are referred to explain detailed features of corresponding components in the first and second states of the mobile terminal 100.

The mobile terminal 100 of the present disclosure includes a main frame in which components are mounted, and the main frame of the present disclosure may vary in size in the first direction as shown in FIG. 2. One or more frames move relative to each other, and sizes thereof may vary in the first direction. Electronic components are mounted in the main frame, and the flexible display unit 151 is located out of the main frame.

Since the mobile terminal 100 of the present disclosure includes the flexible display unit, the flexible display unit 151 may be combined in a form surrounding a front face and a rear face of the main frame. The main frame may include first to third frames 101 to 103. The main frame may include the first frame 101, the second frame 102 moving in the first direction with respect to the first frame 101, and the third frame 103 moving in the first direction with respect to the second frame 102. The first frame 101 and the second frame 102 include front portions, a rear portions, and side portions, respectively, and are coupled to each other. Thus, the mobile terminal 100 may have a hexahedral outer shape by such coupled first and second frames 101 and 102. In consideration of an illustrated configuration of the first to third frames 101 to 103, movements of the second and third frames 102 and 103 may be a slide movement.

First of all, the first frame 101 corresponds to a main body of the mobile terminal 100 and may form a space inside to receive various parts therein. And, the first frame 101 may receive the second frame 102, which is movably coupled to the first frame 101, within such a space. Particularly, as illustrated in FIG. 2 and FIG. 5, the first frame 101 may include a first front part 1011 disposed on the front surface of the mobile terminal 100 and first and second rear parts 1011 and 1012 disposed on the rear surface of the mobile terminal 100.

Each of the first front part 1011, the first rear part 1012 and the second rear part 1013 may include an approximately flat plate-type member. The first rear part 1012 and the second rear part 1013 may include separate members coupled together or a single member illustrated in the drawing. In order to form a predetermined space, the first font part 1011 and the first/second rear part 1012/1013 may be spaced apart from each other in a predetermined gap and connected to each other by a lateral part 1014. As parts of the mobile terminal 100, the controller 180 and the power supply unit 190 may be received in the space within the first frame 101. For example, the controller 180 may include a circuit board including a processor and electronic circuit for controlling operations of the mobile terminal 100 and the power supply unit 190 may include a battery and related parts. Moreover, the second frame 102 and the driving unit 200 described alter may be received in the first frame 101 as well.

As described above, the display unit 151 has the continuous body, and thus, may be disposed on both the front face and the rear face of the mobile terminal 100 while being rolled in the mobile terminal 100. The display unit 151 may include the front face positioned at the front face of the mobile terminal 100, the rear face positioned at the rear face of the mobile terminal 100, and the side face positioned between the front face and the rear face thereof and surrounding the side face of the mobile terminal. The front face and the rear face of the display unit 151 are flat, and the side face of the display unit 151 may form a curved face. When the flexible display unit 151 may be damaged when being bent. Thus, the flexible display unit 151 may be formed to be bent with a predetermined curvature.

The display unit 151 may be divided into a fixed portion and a variable portion. The fixed portion means a portion fixed to the frame. Because of being fixed to the frame, the fixed portion maintains a constant shape without changing a bending degree. On the other hand, the variable portion means a portion in which a bending angle or a position of the bent portion changes. The variable portion in which the position or bending angle of the bent portion changes requires a structure for supporting a rear face of the variable portion in response to the change.

A first region of the display unit 151 may be coupled to the first front portion 1011 corresponding to the front face of the mobile terminal 100.

On the other hand, as well illustrated in FIG. 4, for the installation of various physical input units 120 and sensor units 140 for manipulations of the mobile terminal 100, the display unit 151 may be disposed on the second rear part 1013 only. Since the first rear part 1012 is always exposed externally, the input unit 120 such as various buttons, switches, the camera 121 and a flash and the sensor unit 140 such as the proximity sensor 141 may be disposed on the first rear part 1012. A typical bar-type terminal includes a display unit provided to a front surface of the terminal only. Hence, a camera is disposed on a rear surface of the terminal in order to capture an image by viewing a thing located at the opposite side of a user through a display unit. In order for the user to capture himself by viewing himself through the display unit, an additional camera needs to be provided to the front surface of the terminal.

Yet, according to the mobile terminal 100 of the present disclosure, the display unit 151 is located on both of the front and rear surfaces thereof. Therefore, when a user takes a selfie, the display unit located on the same side of the camera 121, i.e., a portion of the display unit 151 located on the rear surface of the mobile terminal 100 in the drawing may be used. When a thing at the opposite side of the user is captured, the display unit located on the opposite side of the camera 121, i.e., a portion of the display unit 151 on the front surface of the mobile terminal 100 in the drawing may be used. For that reason, the mobile terminal 100 may capture a thing located at the opposite side of a user or a selfie using the single camera 121. The camera may include a plurality of cameras of different view angles such as a wide angle, a super wide angle, a telescope, etc. A proximity sensor, an audio output module and the like may be located on the first rear part 1012 as well as the camera, and an antenna 116 may be installed thereon.

The lateral part 1014 may be elongated along edges of the first front part 1011 and the first/second rear part 1012/1013 to enclose a circumference of the first frame 101 and form an exterior of the mobile terminal 100. Yet, as mentioned above, since the second frame 102 is received in the first frame 101 and movably coupled thereto, a portion of the first frame 101 needs to be open to allow the relative movement of the second frame 102 to the first frame 101. As well illustrated in FIG. 2, for example, since the second frame 102 is movably coupled to one of both side parts of the first frame 101, the lateral part 1014 is not formed at such a side part, thereby opening it. Hence, the first frame 101 may include a first side part 101a substantially closed and a second side part 101b disposed to oppose the first side part 101a so as to be open. Since the lateral part 1014 is exposed from the mobile terminal 100, the interface unit 160 for connecting to a power port or an earphone jack or the user input unit 120 such as a volume button and the like may be disposed thereon. In case of containing metal substance, the lateral part 1014 may play a role as an antenna.

The second rear portion 1013 of the first frame 101 may be covered by the display unit, but may be disposed on the front face of the display unit using a transparent material.

Referring to FIG. 2, the second frame 102 may include a second front part 1021 disposed on the front surface of the mobile terminal 100 and a third rear part 1022 disposed on the rear surface of the mobile terminal 100. Like the first front part 1011, the first rear part 1012 and the second rear part 1013 of the first frame 101, each of the second front part 1021 and the third rear part 1022 may be formed of an approximately flat plate-type member. Moreover, the second frame 102 may receive various parts therein and should not interfere with the parts received in the first frame 101 while moving. Hence, the second front part 1021 and the third rear part 1022 may be coupled together in a manner of being spaced apart from each other and have a shape not interfering with the parts within the first frame 101.

Moreover, the display unit 151 may be folded at 180° while being rolled up within the second frame 102 so as to be disposed on both of the front and rear surfaces of the mobile terminal 100. For such arrangement of the display 151, the second frame 102 may include a roller 1028 rotatably disposed therein. The roller 1028 may be disposed at a random position within the second frame 102. Yet, the display 151 should be spread flat on the front and rear surfaces of the mobile terminal 100 to provide a user with a screen of a good quality. For such a spread, an appropriate tension should be provided to the display 151. In order to provide the proper tension, the roller 1028 may be disposed at a first directional end of the second frame 102. The roller 1028 may extend in the third direction, and may be rotatably coupled to the second frame 102.

The display unit 151 may be rolled around the roller 1028 by being gradually curved with a predetermined curvature. Moreover, the roller 1028 may be installed to freely rotate on the second frame 102 by contacting with an inner surface of the display unit 151. Therefore, the roller 1028 is substantially capable of moving the display unit 151 in a direction vertical to a lateral direction, i.e., a length direction of the mobile terminal 100. As described later, when the second frame 102 is slid, the display unit 151 is moved by the tension applied by the second frame 102 to the front or rear surface of the mobile terminal 100 relatively to the second frame 102 in a different direction (i.e., the first direction D1 or the second direction D2). In doing so, such a movement may be guided by the roller 1028 that is rotating.

In addition, the roller 1028 is disposed on a first side portion 102a of the second frame 102, and the first side portion 102a actually corresponds to an outermost side portion of the mobile terminal 100. When the first side portion 102a of the second frame 102 is exposed, the display unit 151 rolled on the roller 1028 may be damaged. Accordingly, the second frame 102 may include a side frame 1024 disposed on the first side portion 102a.

The side frame 1024 extends in the longitudinal direction of the second frame 102 to cover the first side portion 102a, thereby protecting the roller 1028 and the display unit 151 rolled thereon. That is, the side frame 1024 covers the side face of the display unit 151, and the side face thereof is located in the third region. The first to third regions are at specified positions on the flexible display unit and do not change in size or position, but the sizes of the front face and the rear face, and the position of the side face are determined based on the state of the main frame.

The first region and the second region correspond to the fixed portion described above, and the third region corresponds to the variable portion described above.

The third region may vary in position depending on the state of the mobile terminal. Because the side face is rolled by the roller, the side face is bent with the predetermined curvature, and an inner face of the side frame may include a curved face corresponding to the curvature of the side face.

Because of the side frame 1024, the second frame 102 may have the substantially closed first side portion 102a, and the side frame 1024 may substantially form the outer shape of the mobile terminal 100 together with the side face 1014 of the first frame 101. In addition, the second frame 102 may include a second side portion 102b that is disposed opposite the first side portion 102a to minimize interference with the components within the first frame 101 during the movement, and is opened.

Such a second frame 102 is movably coupled to the first frame 101, and thus may slide in the predetermined first or second direction D1 or D2 relative to the first frame 101. More specifically, the second frame 102 may be movably coupled to the first frame 101 through the side portion of the first frame 101, more precisely, through the opened second side portion 101b, as shown. More specifically, the second side portion 102b of the second frame is disposed relatively adjacent to the first side portion 101a of the first frame 101 which is closed. Accordingly, the first side portion 102a of the second frame may be disposed to be opposite to the first side portion 101a. Accordingly, the second side portion 102b is inserted into the first frame 101 through the side portion of the first frame, that is, the second side portion 101b thereof. The first side portion 102a is not inserted into the first frame 101 but is always located outside the first frame 101, thereby forming the outer shape of the mobile terminal 100 as described above. However, when necessary, such first side portion 102b of the second frame 102 may also be inserted into the first frame 101.

Because of such positional relationship, the second frame 102 may extend from or contract to the first frame 101 in a direction perpendicular to the longitudinal direction of the mobile terminal 100 or the first frame 101. That is, the first and second directions D1 and D2 may basically be directions perpendicular to the longitudinal direction of the mobile terminal 100 or the first frame 101. Further, the first and second directions D1 and D2 may also be described as the lateral direction or the horizontal direction of the mobile terminal 100 or the first frame 101. In addition, during the movement in the first direction D1, the second frame 102 extends from the first frame 101. Accordingly, the first direction D1 may be a direction in which the second frame 102 moves away from the first frame 101, that is, moves outwardly of the mobile terminal 100 or the first frame 101. On the other hand, during the movement in the second direction D2, the second frame 102 contracts to the first frame 101. Thus, the second direction D2 is a direction opposite to the first direction D1, so that the second direction D2 may be a direction in which the second frame 102 moves to become closer to the first frame 101, that is, moves inwardly of the mobile terminal 100 or the first frame 101. When being moved in the first direction D1, such second frame 102 extends and applies a force to the portion of the display unit 151 disposed on the rear face of the mobile terminal 100, so that the portion of the display unit 151 may be disposed on the front face of the mobile terminal 100, and a region for such additional arrangement may be defined. Thus, the second frame 102 may convert the mobile terminal 100 into the second state with the display unit 151 with the relatively extended front face by moving in the first direction D1. On the other hand, when being moved in the second direction D2, the second frame 102 contracts into an original state thereof, and applies a force to the portion of the display unit 151 disposed on the front face of the mobile terminal 100 to return to the rear face of the mobile terminal 100 again. Thus, the second frame 102 may convert the mobile terminal 100 into the first state with the display unit 151 with the relatively contracted front face by moving in the second direction D2. Accordingly, the second frame 102 selectively exposes the display unit 151 to the front face of the mobile terminal 100 depending on the moving direction (i.e., the first or second direction D1 and D2). Accordingly, the mobile terminal 100 may be converted into the first or second state defined above.

During the expansion and the contraction in such first and second directions D1 and D2, the second frame 102 may overlap the first frame 101, more precisely, the first front portion 1011 and the first rear portion 1012 thereof so as not to interfere with the first frame 101. More specifically, the display unit 151 may be coupled to and supported by the first front portion 1011 of the first frame 101, as described above. Accordingly, the display unit 151 does not need to be additionally supported by the second front portion 1021 of the second frame 102. Rather, when the second front portion 1021 is interposed between the first front portion 1011 and the display unit 151, the display unit 151 may be deformed or damaged because of friction with the second front portion 1021, which is repeatedly moved. Thus, the second front portion 1021 may be disposed below the first front portion 1011, as shown in FIG. 5. That is, a front face of the second front portion 1021 may face the rear face of the first front portion 1011. In addition, the rear face of the first front portion 1011 may be in contact with the front face of the second front portion 1021 to stably support the movement of the second frame 102.

The third rear portion 1022 of the second frame 102 may be disposed below the second rear portion 1013 of the first frame 101. That is, the front face of the third rear portion 1022 may face the rear face of the second rear portion 1013. In addition, the rear face of the second rear portion 1013 may be in contact with the front face of the third rear portion 1022 to stably support the movement of the second frame 102. Because of such arrangement, the third rear portion 1022 may be exposed to the outside of the first frame, more precisely, of the second rear portion 1013, and may be coupled to the display unit 151.

Alternatively, when the second rear portion 1013 is made of a transparent material, the second rear portion 1013 may form an outer shape of the rear face of the mobile terminal. The second rear portion 1013 may be positioned rearward of the third rear portion 1022 of the second frame, and the flexible display unit may be disposed between the second rear portion 1013 and the third rear portion 1022 in the first state.

When the second rear portion 1013 is made of a material such as a transparent glass to form the outer shape of the rear face of the mobile terminal, the first rear portion 1012 may be implemented using the same member as the second rear portion 1013. That is, the camera 121, the flash or the sensing unit 140, and the like may be arranged by partially coating the plate-shaped member of the transparent glass material to not allow the internal components to be visible and by not coating only a required portion.

In addition, the second frame 102 may expand and contract the size of the mobile terminal 100 itself, particularly the front face of the mobile terminal 100 by the expansion and the contraction in the first and second directions D1 and D2. Thus, the display unit 151 must move by such extended or reduced front face size to obtain the intended first and second states. However, when being fixed to the second frame 102, the display unit 151 may not be moved smoothly to be adapted for the front face of the mobile terminal 100 that is expanded or contracted. For this reason, the display unit 151 may be movably coupled to the second frame 102. More specifically, the display unit 151 may include a first side edge (or side end) 151*d* disposed on the front face of the mobile terminal 100 and a second side edge 151*e* opposite to the first side edge 151*d* and disposed on the rear face of the mobile terminal 100. The first side edge 151*d* may be disposed on the front face of the first frame 101, that is, the front face of the first front portion 1011 thereof, and may be disposed adjacent to the side portion of the mobile terminal 100, that is, the first side portion 101*a* of the first frame. On the other hand, since the second side edge 151*e* is adjacent to the rear face of the mobile terminal 100 and the third rear portion 1022 of the second frame 102, the second side edge 151*e* may is be coupled the third rear portion 1022 of the second frame 102 to be movable in the first and second directions D1 and D2. In addition, since the display unit 151 is not structurally strong, a third frame 103 may be coupled to the second side edge 151*e*. The third frame 103 may be formed of a plate-shaped member extending in the longitudinal direction of the mobile terminal 100. Accordingly, the third frame 103 may be coupled to the second frame, that is, the third rear portion 1022 thereof to be movable in the first and second directions D1 and D2 instead of the second side edge 151*e*. In addition, the second frame 102 may include a slot 1025 extending in the lateral direction of the mobile terminal 100 or the second frame 102, that is, the direction perpendicular to the longitudinal direction thereof. Further, the third frame 103 may be stably moved while being guided by the slot 1025. The third frame 103 may include, for example, a projection inserted into the slot 1025 for the movement along the slot 1025.

Referring to FIGS. 3 to 5, in connection with such configuration of the first to third frames 101, 102, and 103, the display unit 151 may include a first region 1511 extending from one side thereof, that is, the first side edge 151*d* toward the second side edge 151*e* by a predetermined length, and a second region 1512 disposed opposite the first region 1511, and extending from the second side edge 151*e* toward the first side edge 151*d* by a predetermined length. In addition, the display unit 151 may include a third region 1513 disposed between the first and second regions 1511 and 1512. Such first to third regions 1511, 1512, and 1513 may be connected to each other, and may form a continuous body of the display unit 151. In addition, as described above, for the movement of the third region 1513 toward the front face or the rear face of the mobile terminal 100 depending on the moving direction of the second frame 102, the first region 1511 may be fixed so as not to move to the front face of the mobile terminal 100, and the second region 1512 may be provided to be movable on the rear face of the mobile terminal. Such configuration of the display unit 151 will be described in more detail below.

The first region 1511 may be disposed on the front face of the mobile terminal 100, more specifically, the first frame 101, that is, on the front face of the first front portion 1011. The first region 1511 is fixed to the first frame 101, that is, the front face of the first front portion 1011 so as not to be moved during the movement of the second frame 102, and thus, the first region 1511 may always be exposed to the front face of the mobile terminal 100. The third region 1513 may be adjacent to the first region 1511, and may extend into the second frame 102 and rolled on the roller 1028. The third region 1513 may consecutively extend out of the second frame 102 again and partially cover the second frame 102, that is, the rear face of the third rear portion 1022. Further, the second frame 102, that is, the third rear portion 1022, is adjacent to the first frame 101, that is, the second rear portion 1013 and together forms the rear case of the mobile terminal 100, so that it may be described that the third region 1513 is also disposed on the rear face of the first frame 101.

The second region 1512 may be adjacent to the third region 1513 and may be disposed on the rear face of the mobile terminal 100, more specifically, on the second frame, that is, the rear face of the third rear portion 1022 thereof. The second region 1512 may be coupled to the third frame 103 without being directly coupled to the second frame 102. As shown in FIG. 4 (*b*), the slot 1025 extending in the lateral direction (i.e., the direction perpendicular to the longitudinal direction of the mobile terminal 100) to the second frame 102, that is, to the third rear portion 1022 is defined. Further, the third frame 103 may move along the slot 1025. In FIG. 4 (*b*), it is shown that the slot 1025 is defined in the rear face of the second frame 102, but may be defined in the side face of the second frame 102. Although the second region 1512 may move in the first or second direction D1 or D2 with respect to the second frame 102 together with the third frame 103, the movement of the second region 1512 may be restricted within the rear face of the mobile terminal 100 by the slot 1025. That is, the second region 1512 does not move out of the second frame 102 even when the second frame 102 is extended or contracted, and may move along the slot 1025 within the second frame 102 by the extended or contracted distance of the second frame 102. Accordingly, the second region 1512 may always be exposed to the rear face of the mobile terminal 100.

As a result, the first region 1511 may be disposed on the front face of the mobile terminal 100 and may be always exposed to the front face regardless of the movement of the second frame 102, and the second region 1512 may be disposed on the rear face of the mobile terminal 100 and may be always exposed to the rear face regardless of the movement of the second frame 102. In addition, the third region 1513 may be disposed between the first and second regions 1511 and 1512, and may be selectively placed on the front face or the rear face of the mobile terminal 100 depending on the moving directions D1 and D2 of the second frame 102.

Because of such selective placement of the third region 1513, as shown in FIG. 4 (*b*), the second rear portion 1013 of the first frame 101 is covered by the second and third regions 1512 and 1513 and the third rear portion 1022 of the display unit 151 in the first state, but the third region 1513 moves to the front face of the mobile terminal 100 in the second state, and the third rear portion 1022 also moves in the first direction D1, so that the mobile terminal 100 may be exposed to the outside. In addition, the second front portion 1021 of the second frame 102 is disposed below the first front portion 1011 of the first frame 101 in the first state, but is moved out of the first frame 101 and supports the third region 1513 of the display unit 151 disposed on the front face of the mobile terminal 100 in the second state.

Since the first and second regions 1511 and 1512 are always respectively arranged on the front face and the rear face of the mobile terminal 100, curvatures of the first region 1511 and the second region 1512 do not change, and the first region 1511 and the second region 1512 may be maintained in a flat basic state. However, the third region 1513 may be rolled on the roller 1028 and bent in the second frame 102. When converting from the first state to the second state, the third region 1513 may extend from the second frame 102 to the front face of the mobile terminal 100 while being rolled on the roller 1028 in one direction. On the other hand, when converting from the second state to the first state, the third region 1513 may be retracted from the front face of the mobile terminal 100 to the second frame 102 while being rolled on the roller 1028 in the opposite direction, and at the same time, may return to the rear face of the mobile terminal 100 from the second frame 102. A specific location of the foldable mobile terminal in a form of being spread like a book is easily damaged because only the specific location is folded repeatedly. On the other hand, the deformed portion of the flexible display unit 151, that is, a portion rolled on the roller 1028, may vary based on the first and second states of the mobile terminal 100, that is, the movement of the second frame 102. Accordingly, the mobile terminal 100 of the present disclosure may significantly reduce deformation and fatigue repeatedly applied to a specific portion of the display unit 151, thereby preventing damage to the display unit 151.

Based on the above-described configuration, overall operations of the mobile terminal 100 will be described as follows. As an example, the state conversion may be performed manually by the user, and an operation of the mobile terminal 100 during such manual state conversion will be described. However, operations of the first to third frames 101 to 103 and the display unit 151, which will be described below, may be performed in the same manner when a power source other than a user's force is used, for example, when the driving unit 200 to be described below is applied.

As shown in FIGS. 3A, 4A, and 5A, the second frame 102 is fully retracted into the first frame 102 in the first state. Therefore, only the first region 1511 of the display unit 151 fixed to the front face of the first frame 101 may be exposed to the front face of the mobile terminal 100. Such first region 1511 may be fixed and supported to the first frame 101, that is, the first front portion 1011 thereof. In addition, a major portion of the third region 1513 may be disposed on the rear face of the mobile terminal 100 together with the second region 1512, and the third region 1513 may be disposed in the second frame 102 while being partially rolled on the roller 1028. The third region 1513 of the rear face of the mobile terminal 100 may be supported by the second frame, that is, the third rear portion 1022 thereof. The second region 1512 may be fixed by the third frame 103 disposed on the second frame (i.e., the third rear portion 1022) and may be movably coupled to the second frame 1012.

In such first state, when the second frame 102 moves in the first direction D1, the mobile terminal 100 may be converted into the second state. As shown in FIGS. 3B, 4B, and 5B, the second frame 102 may extend from the first frame 101 by the movement in the first direction D1, and may increase the overall size of the mobile terminal 100, in particular, the front face thereof. During the movement in the first direction D1, the second frame 102 may apply a force, that is, a tension, to the display unit 151 in the first direction D1. The display unit 151 is fixed to the first frame 101 but is coupled to the second frame 102 so as to be movable using the third frame 103, so that the force applied by the second frame 102 allows the third region 1513 to be rolled out from the roller 1028 of the second frame 102 to the front face of the mobile terminal 100. That is, the third region 1513 may be withdrawn (or pulled out) from the second frame 102 or extend to (or move out of) the second frame 102. At the same time, the third region 1513, particularly, the portion located on the rear face of the third region 1513 may be rolled into the roller 1028 of the second frame 102 from the rear face, or may be inserted (or pushed in), retracted, or moved into the second frame 102. Not an entirety of the third region 1513 is withdrawn from the second frame 102 to the front face of the mobile terminal 100, and a portion of the third region 1513 may be disposed in the second frame 102 while still being rolled on the roller 1028. In addition, for the smooth movement of the third region 1513, the second region 1512 may also move in the first direction D1 with respect to the second frame 102 together with the third frame 103. In addition, as described above, the second region 1512 and the third frame 103 may be constrained to the second frame 102 and move in the first direction D1 with respect to the first frame 101 together with the second frame 102.

Accordingly, the second region 1512 and the third frame 103 may move in the first direction D1 relative to the first frame 101 as well as the second frame 102, and accordingly, move a distance longer than the moved distance of the second frame 102. Thus, because of such long distance movement in the first direction D1 of the second region 1512, the third region 1513 may be smoothly extended to the front face of the mobile terminal 100. Further, for the movement of the third region 1513, which is proportional to the expansion of the second frame 102, the movement of the second region 1512 and the third frame 103 in the first direction D1 may be performed simultaneously with the movement of such third region 1512 and second frame 102 in the first direction D1 so as to be proportional to the movement of third region 1513 and second frame 102.

When the second frame 102 is fully extended in the first direction D1, the first and third regions 1511 and 1513 may be arranged on the front face of the mobile terminal 100, and only the second region 1512 may be disposed on the rear face of the mobile terminal 100. Such first and third regions 1511 and 1513 may be supported by the first frame (i.e., the first front portion 1011 thereof) and the second frame (i.e., the second front portion 1021 thereof). In addition, the second frame 102, i.e., the third rear portion 1022 thereof exposes the second rear portion 1013 of the first frame while extending in the first direction D1, and supports the moving third region 1513. Therefore, in the second state, the mobile terminal 100 may have the extended front face display unit 151.

On the other hand, when the second frame 102 moves in the second direction D2 in the second state, the mobile terminal 100 may again return into the first state as shown in FIGS. 3A, 4A, and 5A. The second frame 102 may be contracted to the first frame 101 by the movement in the second direction D2, and may reduce the overall size of the mobile terminal 100, particularly the front face thereof. The movement of the display unit 151 during such movement of the second frame 102 may be performed in a reverse order of the movement in the first direction D1 described above. In brief, the third region 1513 may be rolled from the front face of the mobile terminal 100 into the roller 1028 of the second frame 102, or may be inserted, retracted, or moved into the second frame 102. At the same time, the third region 1513 may be rolled, withdrawn, extended, or moved out of the roller 1028 of the second frame 102 to the rear face of the mobile terminal 100. Not the entirety of the third region 1513 may be withdrawn from the second frame 102 to the rear face of the mobile terminal 100, and the portion of the third region 1513 may still be placed in the second frame 102 while still being rolled on the roller 1028. In addition, for such smooth movement of the third region 1513, the second region 1512 may also move in the second direction D2 with respect to the second frame 102 together with the third frame 103. The second region 1512 and the third frame 103 may be constrained to the second frame 102 to move in the second direction D2 with respect to the first frame 101 together with the second frame 102. Accordingly, the second region 1512 and the third frame 103 may move relatively in the second direction D2 with respect to not only the second frame 102 but also the first frame 101. As a result, the second region 1512 and the third frame 103 may move in the second direction D2 a distance larger than the moved distance of the second frame 102. Thus, because of such long distance movement of the second region 1512, the third region 1513 may be smoothly returned to the rear face of the mobile terminal 100. Further, for the movement of the third region 1513 proportional to the contraction of the second frame 102, the movements of the second region 1512 and the third frame 103 in the second direction D2 may be performed simultaneously with the movements of the third region 1512 and the second frame 102 in the second direction D2 to be proportional to the movements of the third region 1513 and the second frame 102. When the second frame 102 is completely contracted in the second direction D2, the mobile terminal 100 may be converted into the first state as described above, and may have the display unit 151 with the front face that is relatively reduced in comparison with the second state in the first state.

The flexible display unit 151 has one surface that is exposed outside and on which an image is output, and another surface, which may be coupled to a frame that supports the flexible display unit 151.

The first region of the flexible display unit 151 is supported by the first frame 101, and the second region of the flexible display unit 151 is supported by the third frame 103. However, the third region is not directly coupled to the first to third frames 101, 102, and 103 constituting the body of the mobile terminal. Since the third region, that is, the variable portion, has a variable curvature depending on a bending position or bending deformation, a support frame 230 having a variable curvature corresponding thereto is needed.

Figure 6:
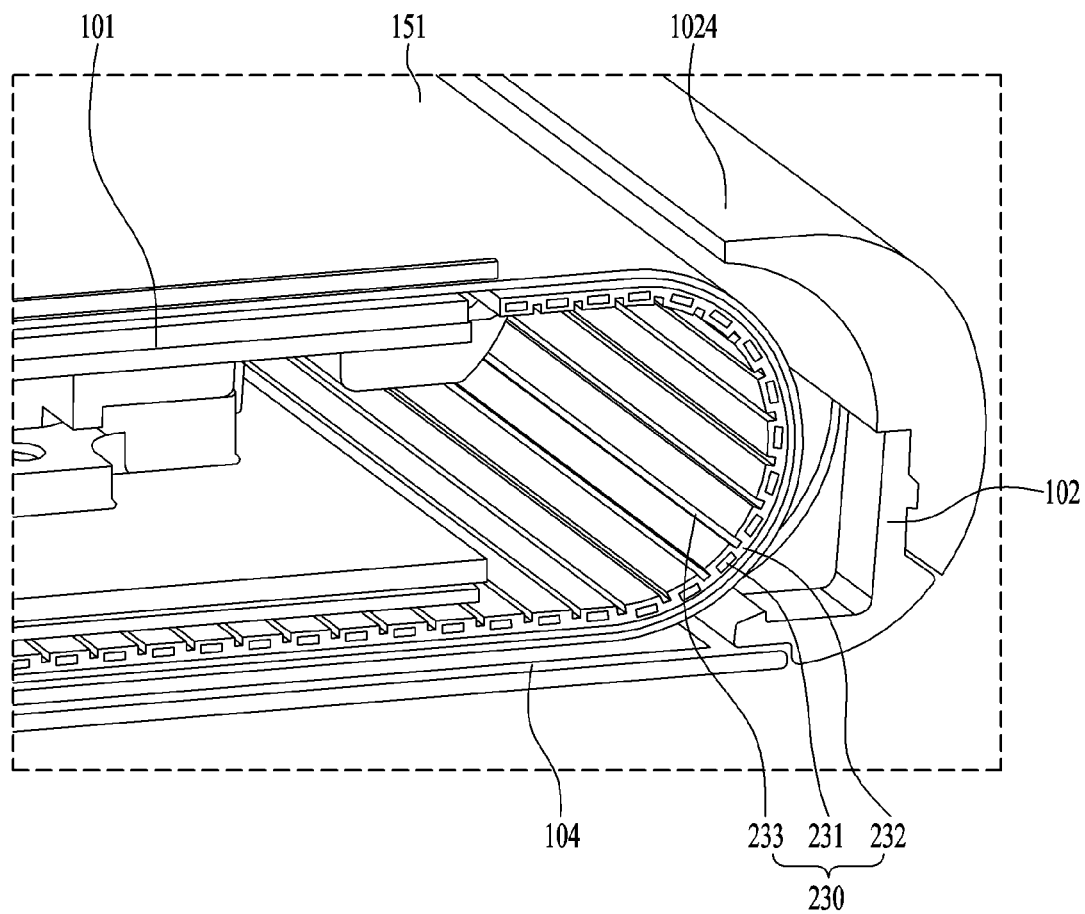
FIG. 6 is an enlarged view of a support frame of a mobile terminal according to one embodiment of the present disclosure.

FIG. 6 is an enlarged view of the support frame 230 of the mobile terminal according to one embodiment of the present disclosure. The support frame 230 supports the other surface of the variable portion of the flexible display unit 151, thereby enabling stable touch input even on the variable portion and preventing the variable portion from being damaged by an external force.

The second front portion 1021 of the second frame is inside the first front portion 1011 of the first frame in the first state. When the second front portion 1021 moves in the first direction so as to be switched to the second state, a gap corresponding to the thickness of the first front portion 1011 is generated between the flexible display unit 151 and the second front portion 1021. When the support frame 230 having a thickness corresponding to the gap is employed, a problem in which the front portion of the flexible display unit 151, which is extended in the second state, becomes spaced apart from the second front portion 1021 may be solved.

The support frame 230 may include a plurality of rigid bars 231 disposed in the third direction and a flexible portion 232 connecting the rigid bars 231. The rigid bars 231 may be made of a material having rigidity, such as a metal material, and may support the other surface of the third region of the flexible display unit 151. The flexible portion 232 may be made of a flexible material such as silicon, and may be deformed when the flexible display unit 151 is wound around the roller.

A part of the flexible portion 232 may be smaller in thickness than the rigid bar 231 so as to enable the flexible portion 232 to be easily deformed. The thin part of the flexible portion 232 may be a groove 233 extending in the third direction, as illustrated in FIG. 6. The groove 233 may be provided in a plural number, and may be arranged side by side in the first direction. The grooves 233, formed in the rear surface of the support frame 230, and a protruding portion, positioned between the grooves 233, form a flexible rack gear 234.

The roller 1028 is formed, on the outer circumferential surface thereof, with an uneven surface corresponding to the flexible rack gear 234. Accordingly, when the roller 1028 rotates, the flexible display unit 151 may move along with the roller 1028 without sliding thereon.

When the mobile terminal is switched from the first state to the second state or vice versa and changes in size in the first or second direction, the area of the flexible display unit 151 that is located on the front surface and the area of the flexible display unit 151 that is located on the rear surface also change in size. In the case of switching from the first state to the second state, the roller 1028 rotates while the second frame 102 moves in the first direction, and naturally, the area of the flexible display unit 151 that is located on the rear surface decreases and the area of the flexible display unit 151 that is located on the front surface increases. Conversely, in the case of switching from the second state to the first state, when the second frame 102 moves in the second direction, the flexible display unit 151 should also move correspondingly at the same speed.

When switching from the first state to the second state, the flexible display unit 151 may move together with the second frame 102. However, when switching from the second state to the first state, the flexible display unit 151 may not move together with the second frame in the second direction, whereby the flexible display unit 151 may lift, and may interfere with the movement of the second frame 102 in the second direction.

For this reason, when switching from the second state to the first state, force for pulling the flexible display unit 151, located on the front surface, in the first direction and moving the same to the rear surface is needed. In order to keep the flexible display unit 151 flat even after the transition from the first state to the second state is completed, force for pulling the flexible display unit 151, located on the front surface, in the first direction is needed.

In order to keep the flexible display unit 151 flat and to easily switch from the second state to the first state, the mobile terminal 100 of the present disclosure may further include an auxiliary driving unit 210 configured to apply force to the flexible display unit 151, in addition to the driving unit 200 configured to move the second frame 102.

Figure 7:
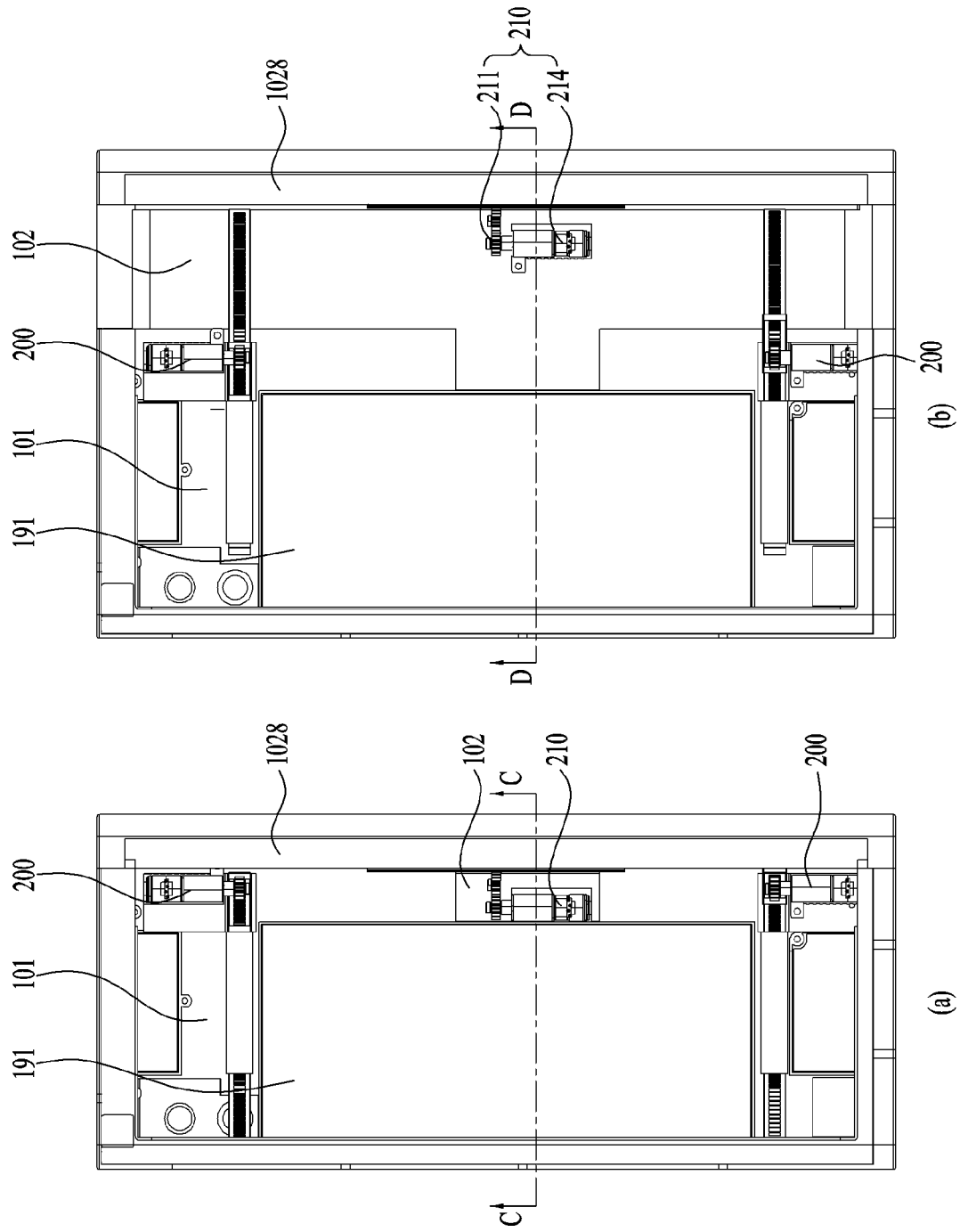
FIG. 7 shows front face views respectively illustrating a first state and a second state without a display unit of a mobile terminal according to one embodiment of the present disclosure.

FIG. 7 shows front face views respectively illustrating the first state and the second state without the flexible display unit 151 of the mobile terminal 100 according to one embodiment of the present disclosure, and the auxiliary driving unit 210 coupled to the second frame 102 is included in the drawing. The auxiliary driving unit 210 of this embodiment may further include a motor 214 coupled to the second frame 102, a pinion gear 211 rotated by receiving the rotational force of the motor 214, and a flexible rack gear 234 formed on the support frame 230. In order to secure space for mounting components such as the battery 191, the motor 214 and the pinion gear 211 may be disposed so as to be biased in the first direction on the first frame.

The pinion gear 211 may be disposed so as to come into contact with the flexible rack gear 234 formed on the rear surface of the support frame 230. The flexible rack gear 234 may provide tensile force acting in the first direction, which is generated by the flexible rack gear 234 being engaged with the pinion gear 211 and receiving the force of the motor 214 through the pinion gear 211, to the flexible display unit.

Figure 8:
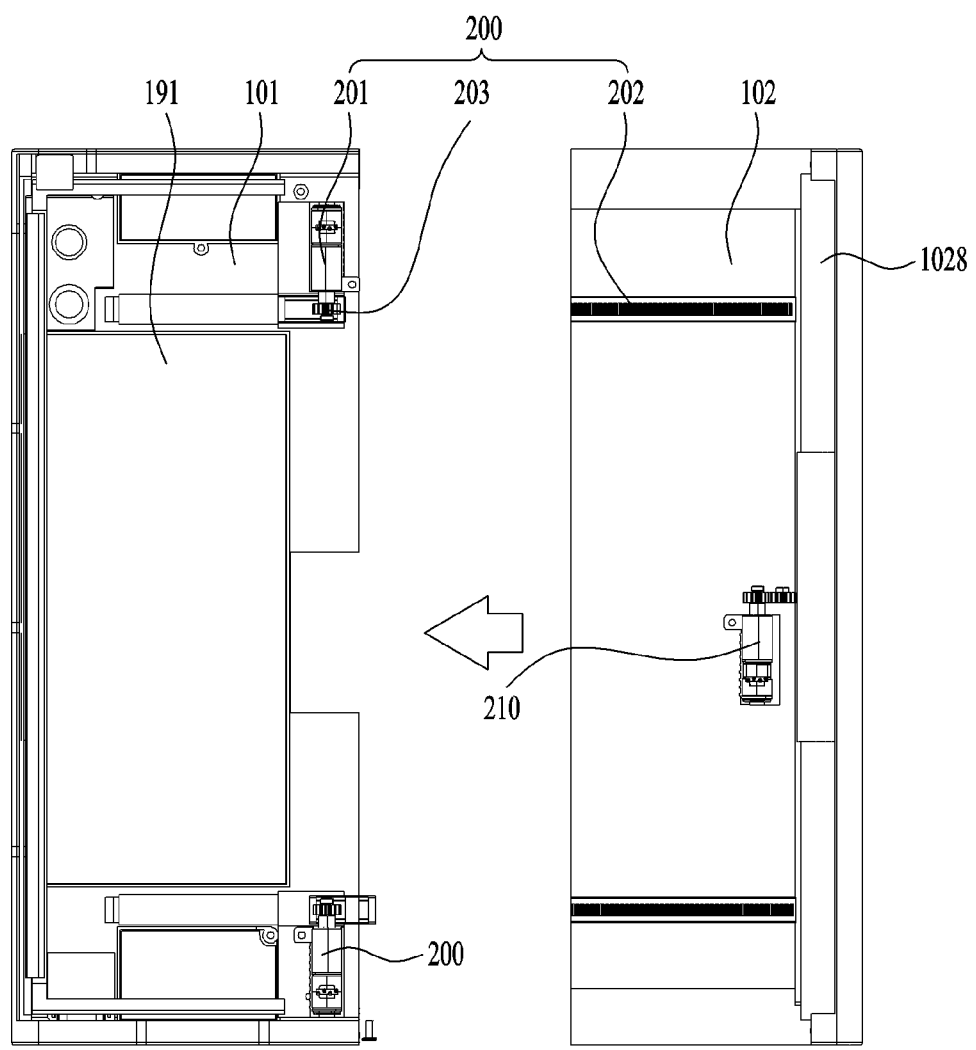
FIG. 8 shows a first frame and a second frame of a mobile terminal according to the present disclosure.

FIG. 8 shows the first frame 101 and the second frame 102 of the mobile terminal 100 according to the present disclosure. The driving unit 200, configured to move the second frame 102 in the first direction or in the second direction with respect to the first frame 101, may include a motor 201, a rack gear 202 extending in a linear direction, and a pinion gear 203 rotated by receiving the rotational force of the motor 201. The motor 201 and the pinion gear 203 are coupled to the first frame 101, and the rack gear 202 is located on the second frame 102.

The auxiliary driving unit 210 also includes the motor 214 and the pinion gear 211. However, the difference between the driving unit 200 and the auxiliary driving unit 210 is that the auxiliary driving unit 210 is fixed to the second frame 102, and rotates by being meshed with the flexible rack gear 234 of the support frame 230, which is located at the rear surface of the flexible display unit 151. In order to avoid interference with the driving unit 200, the auxiliary driving unit 210 may be disposed between a pair of driving units 200 respectively disposed on opposite sides in the third direction (the up-down direction in the drawing) as illustrated in FIGS. 7 and 8.

Figure 9:
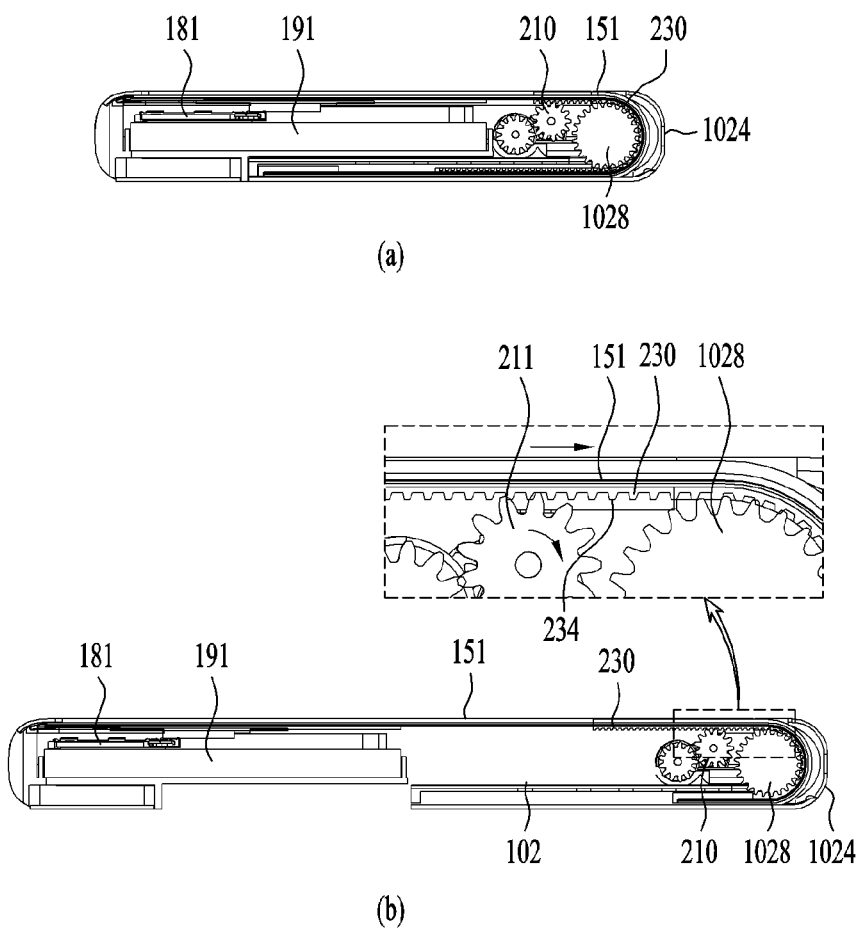
FIG. 9 shows cross-sectional views respectively taken along a line C-C and a line D-D of FIG. 7.

FIG. 9 shows cross-sectional views respectively taken along a line C-C and a line D-D of FIG. 7. Hereinafter, the operation of the auxiliary driving unit 210 in the first state and in the second state will be described in more detail. The support frame 230 may have the flexible rack gear 234 formed on the other surface thereof, which is opposite one surface thereof to which the display panel is coupled. The flexible rack gear 234 is a gear having a toothed portion thereof, extending in a linear direction rather than being formed on a circumferential surface of a disk. Since the flexible rack gear 234 is made of a flexible material, when the variable portion of the flexible display unit 151 is curved in a direction from the front face to the rear face, the flexible rack gear 234 may be deformed while forming a curved surface.

The flexible rack gear 234 includes the grooves 233 extending in the third direction. The grooves 233 are arranged side by side in the first direction. The grooves 233 may be formed in the flexible rack gear 234 such that the flexible portion 232 positioned between the rigid bars 231 in the above-described support frame 230 is formed to have a small thickness. When the pinion gear 211 in mesh with the grooves 233 in the flexible rack gear 234 rotates and, the flexible rack gear 234 moves, whereby the area of the flexible display unit 151 that is located on the front surface may change.

The pinion gear 211 is fixed to the second frame 102 and rotates by receiving the force of the motor 214. The pinion gear 211 may not be directly connected to the motor 214, and may further include, in a center thereof, a gear that transmits the rotational force.

When the mobile terminal 100 of the present disclosure is switched from the first state (FIG. 9(a)) to the second state (FIG. 9(b)), the second frame 102 moves in the first direction, and the area of the flexible display unit 151 that is located on the front surface increases. Here, because the pinion gear 211, which is in contact with the flexible rack gear 234, changes in position, the pinion gear 211 rotates counterclockwise.

When the mobile terminal 100 is switched from the first state to the second state, the front surface of the flexible display unit 151 is expanded as the second frame 102 moves, whereby the pinion gear 211, which is meshed with the flexible rack gear 234, rotates. When switching from the first state to the second state, the motor 214 of the auxiliary driving unit 210 may not operate, since the motor 214 does not need to provide a force, and only the pinion gear 211 may rotate.

The pinion gear 211 rotates independently of the motor 214 during counterclockwise rotation. The motor may be engaged with the pinion gear 211 in order to transmit only the clockwise rotational force of the motor 214.

When the transition to the second state is completed, as illustrated in FIG. 9(b), the motor 214 rotates in the reverse direction to rotate the pinion gear 211 clockwise and applies a force (tensile force) to the flexible rack gear 234 in the first direction. When the movement of the second frame 102 in the first direction is completed, the area of the flexible display unit 151 that is located on the front surface may be flattened by rotating the pinion gear 211 slightly in the reverse direction.

While the mobile terminal 100 is being switched from the second state to the first state, even if the driving unit moves the second frame 102 in the second direction, the flexible display unit 151 located on the front surface may not move to the rear face of the mobile terminal 100, but may lift or become wrinkled on the second frame 102 or the first frame 101.

For this reason, when the mobile terminal 100 is switched from the second state to the first state (when switched from FIG. 9(b) to FIG. 9(a)), the motor 214 of the auxiliary driving unit 210 may rotate the pinion gear 211 clockwise so as to push the flexible rack gear 234 rightwards (first direction) in the drawing. The end portion in the first direction of the flexible display unit 151 located on the front surface may move toward the rear surface of the mobile terminal 100, thereby reducing the area of the flexible display unit 151 that is located on the front surface.

Here, the length that the flexible display unit 151 is moved by the auxiliary driving unit 210 and the distance that the second frame 102 moves in the second direction should be the same in order to stably switch the mobile terminal from the second state to the first state.

Figure 10:
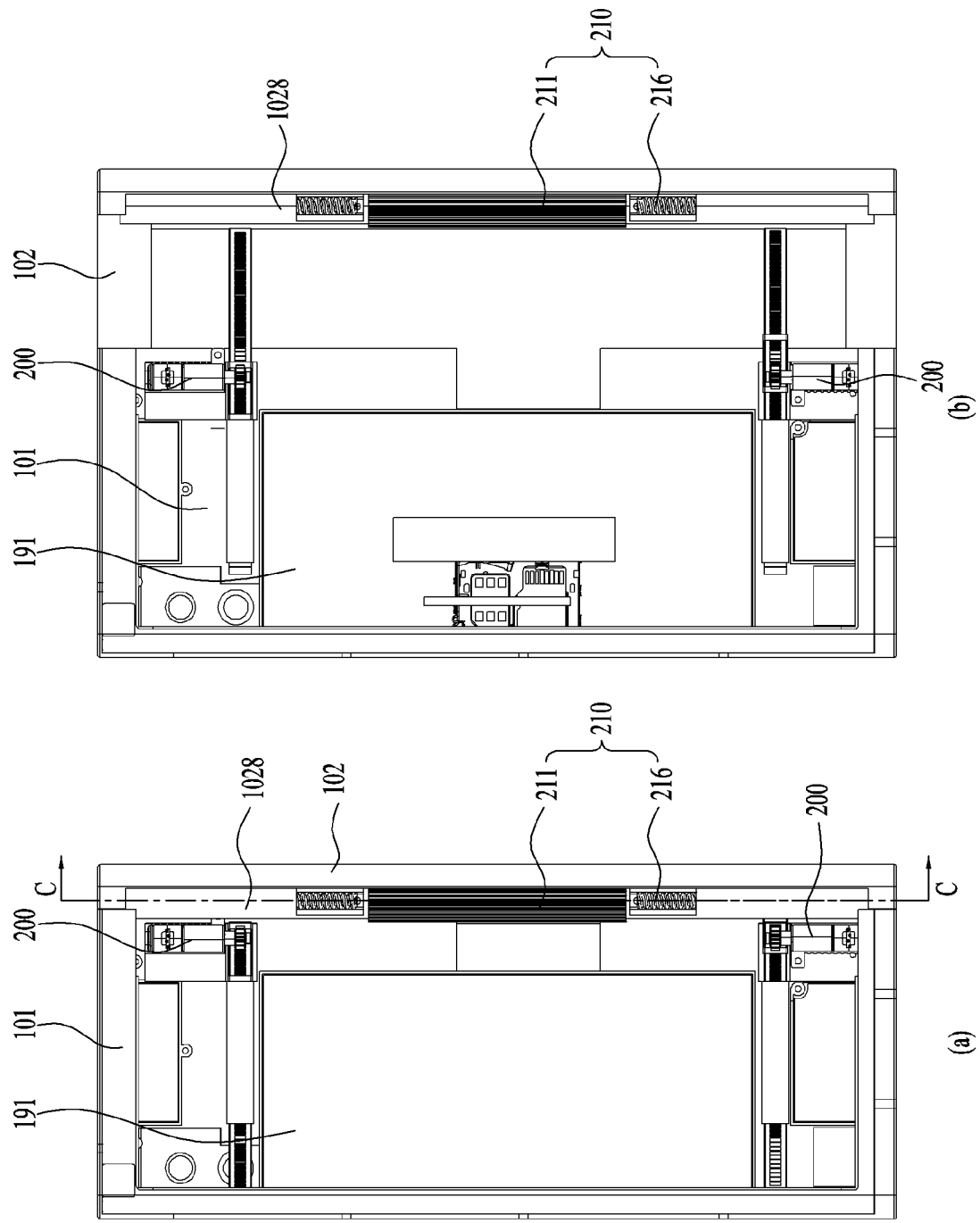
FIG. 10 shows front face views respectively illustrating a first state and a second state without a display unit of a mobile terminal according to another embodiment of the present disclosure.
Figure 11:
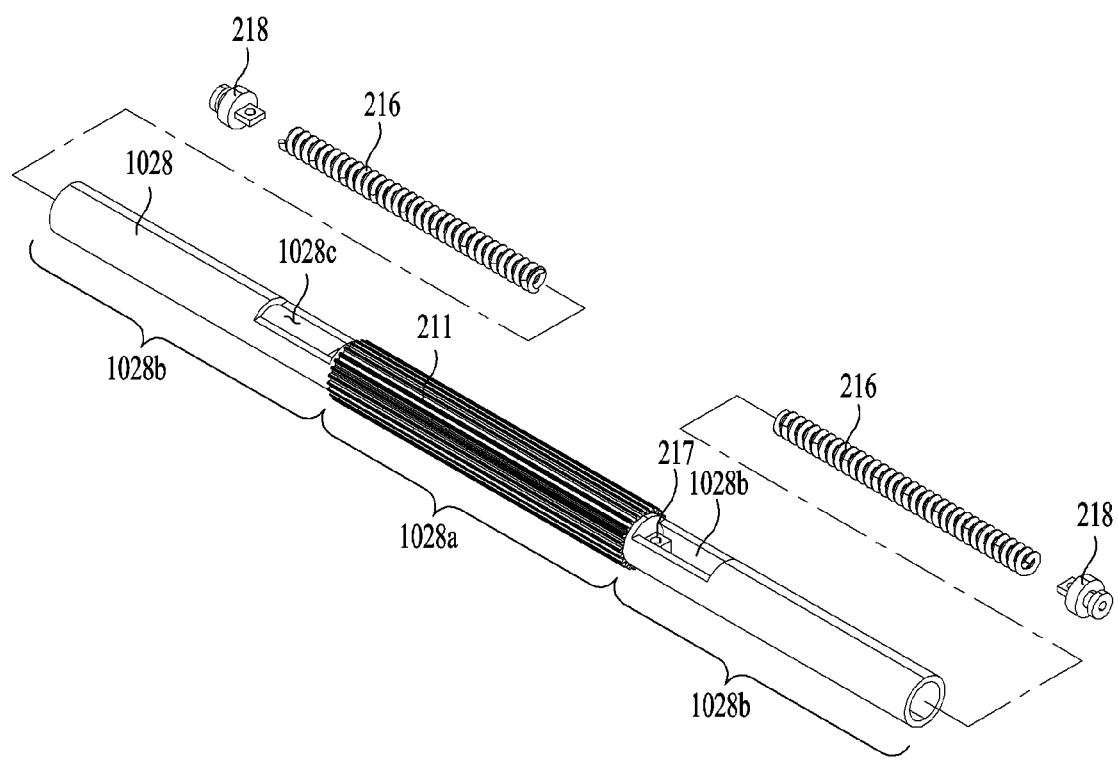
FIG. 11 is a view illustrating a roller and an auxiliary driving unit according to the embodiment of FIG. 10.
Figure 12:
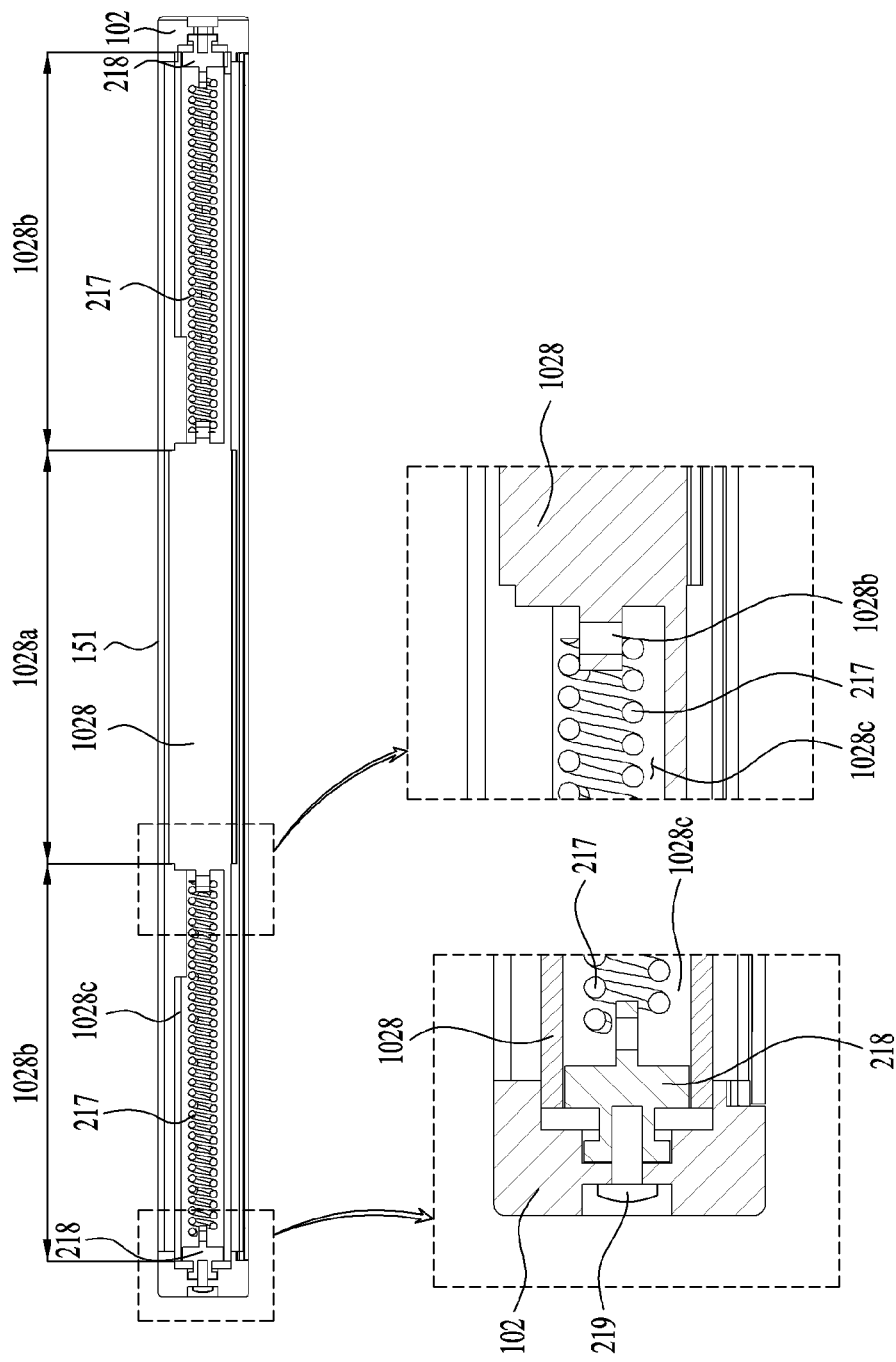
FIG. 12 shows a cross-sectional view taken along a line E-E of FIG. 10.

FIG. 10 shows front face views respectively illustrating the first state and the second state, without a display unit of a mobile terminal 100 according to another embodiment of the present disclosure, FIG. 11 is a view illustrating a roller 1028 and an auxiliary driving unit 210 according to the embodiment of FIG. 10, and FIG. 12 shows a cross-sectional view taken along a line E-E of FIG. 10. The auxiliary driving unit 210 of this embodiment may be mounted inside the roller 1028.

The roller 1028 is a bar-shaped member, which is coupled to a second frame 102 and has a circular cross-section, and is elongated in the third direction. The roller 1028 serves to divide the flexible display unit 151 into a portion located on the front surface and a portion located on the rear surface, and serves to curve the flexible display unit 151 in a direction from the front face to the rear face of the mobile terminal 100 while forming a curved surface.

The roller 1028 of this embodiment has a pinion gear 211 formed on the outer surface thereof. The roller 1028 may be rotated by the engagement between the pinion gear 211 and the flexible rack gear 234. The pinion gear 211 located on the outer circumferential surface of the roller 1028 prevents the flexible display unit 151 from sliding on the roller 1028 so as to synchronize the rotation of the roller 1028 and the movement of the flexible display unit 151.

The roller 1028 of this embodiment may include a first portion 1028a, the interior of which is filled, and a second portion 1028b, having a hollow 1028c formed therein. The second portion 1028b is disposed adjacent to the first portion 1028a in the third direction. The second portion 1028b may be disposed at only one side of the first portion 1028a, but may also be disposed on each of opposite sides of the first portion 1028a as shown in FIG. 11 so as to provide a uniform force.

The second portion 1028b may be positioned at each of opposite ends of the roller 1028 and may have an elastic part 216 disposed therein. One end of the elastic part 216 is coupled to a first fastening portion 217, which is positioned at a boundary between the first portion 1028a and the second portion 1028b. The other end of the elastic part 216 is coupled to a second fastening portion 218, which is provided on the second frame 102. The first fastening portion 217 is located in the hollow 1028c formed inside the second portion 1028b of the roller 1028. Therefore, in order to fasten the one end of the elastic part 216 to the first fastening portion 217, the second portion 1028b may have an opening 1028d exposing the first fastening portion 217.

As illustrated in FIG. 12, the second fastening portion 218 is fixed to the second frame 102 and protrudes toward the hollow 1028c. The roller 1028 is rotatably fastened to the second frame 102 so that the roller 1028 is rotatable about the second fastening portion 218. The roller 1028 may further include a screw 219, configured to fasten the second fastening portion 218 to the second frame 102.

Since the first fastening portion 217 rotates together with the roller 1028 and the second fastening portion 218 is fixed to the second frame 102, the elastic part 216 is deformed when switched from the first state to the second state. The elastic part 216 has elastic force for returning to the first state, and thus, when switched from the second state to the first state, the roller 1028 rotates in the direction in which the flexible display unit 151 is moved to be located on the rear surface.

A coil spring illustrated in FIG. 11 may be used as the elastic part 216. When switching from the first state to the second state, the number of turns of the coil spring is changed while the roller 1028 rotates, thereby generating elastic force for rotating in a direction opposite the direction of switching from the first state to the second state. Therefore, the area of the flexible display unit 151 that is located on the front surface may be reduced as the roller 1028 rotates corresponding to the distance that the second frame 102 moves when switched from the second state to the first state.

In addition, even when the mobile terminal is in the second state, the roller 1028 may provide tensile force due to the elasticity of the elastic part 216, which is a force switching the mobile terminal from the second state to the first state, thereby keeping the flexible display unit 151 flat.

The auxiliary driving unit 210 of the embodiment of FIG. 7 and the auxiliary driving unit 210 of the embodiment of FIG. 10 may be both implemented in one mobile terminal. Alternatively, the auxiliary driving unit 210 may be implemented to have a structure in which the auxiliary driving unit 210 of FIG. 7 further includes only the pinion gear 211 of FIG. 10, which is formed on the outer circumferential surface of the roller 1028.

As described above, in the mobile terminal 100 of the present disclosure, the flexible display unit 151 may also stably move corresponding to the movement of the second frame 102. In addition, due to the tensile force provided to the flexible display unit 151, the flexible display unit 151 may remain flat without lifting, and may remain in close contact with the body of the mobile terminal.

The above detailed description should not be construed as being limitative in all terms, but should be considered as being illustrative. The scope of the present disclosure should be determined by reasonable analysis of the accompanying claims, and all changes in the equivalent range of the present disclosure are included in the scope of the present disclosure.

What is claimed is:

1. A mobile terminal comprising:
a body comprising a first frame, and a second frame coupled to the first frame so as to be movable in a first direction with respect to the first frame;
a roller rotatably coupled to the second frame;
a flexible display unit divided, by being rolled around the roller, into a front portion located on a front surface of the body and a rear portion located on a rear surface of the body, and configured to output an image on one surface thereof;
a support frame coupled to another surface of the flexible display unit and comprising a flexible rack gear formed on another surface of the support frame; and
an auxiliary driving unit
configured to transfer a force to the flexible rack gear in a direction in which a size of an area of the flexible display unit that is located on the rear surface increases,
wherein the auxiliary driving unit comprises:
a pinion gear that rotates by being meshed with the flexible rack gear;
a motor, which is coupled to the second frame and is configured to provide rotational force to the pinion gear;
wherein the motor is configured to
rotate the pinion gear in a first rotational direction when the second frame moves in the first direction;
rotate the pinion gear in a second rotational direction, which is opposite the first rotational direction, when the second frame moves in a second direction; and
rotate the pinion gear by a predetermined angle in the second rotational direction, which is opposite the first rotational direction, so as to provide tensile force to the flexible display unit in the first direction when the second frame finishes moving in the first direction.

2. The mobile terminal according to claim 1, further comprising:
a driving unit configured to move the second frame in the first direction or in a second direction, which is opposite the first direction, with respect to the first frame.

3. The mobile terminal according to claim 1, wherein the flexible rack gear comprises a plurality of grooves extending in a third direction, which is perpendicular to the first direction, and arranged side by side in the first direction.

4. The mobile terminal according to claim 1, wherein the support frame comprises:
a plurality of rigid bars extending in a third direction, which is perpendicular to the first direction, and arranged side by side in the first direction; and
a flexible portion connecting the rigid bars.

5. The mobile terminal according to claim 1, wherein:
the flexible display unit comprises a variable portion positioned on the front surface of the body or on the rear surface of the body depending on a position of the second frame; and
the support frame is located on another surface of the variable portion of the flexible display unit.

6. The mobile terminal according to claim 1, wherein the pinion gear is formed on an outer circumferential surface of the roller.

7. The mobile terminal according to claim 6, wherein the roller comprises:
a first portion, on which the pinion gear is located;
a second portion in a shape of a pipe having a hollow formed therein; and
a first fastening portion, which is formed in the hollow, placed at an end of the first portion, and exposed outside, and
wherein the auxiliary driving unit comprises an elastic part having one end thereof coupled to the first fastening portion and having a remaining end thereof coupled to a second fastening portion provided on the second frame.

8. The mobile terminal according to claim 7, wherein the second fastening portion has one side thereof coupled to the remaining end of the elastic part and located in the hollow in the second portion, and another side thereof fastened to the second frame using a screw.

9. The mobile terminal according to claim 7, wherein the elastic part is a coil spring.

10. The mobile terminal according to claim 7, wherein the roller further comprises an opening, which is formed in an outer circumferential surface of the second portion and exposes the first fastening portion.

11. The mobile terminal according to claim 7, wherein the second portion is provided on each of opposite sides of the first portion.

12. A mobile terminal comprising:
a body comprising a first frame, and a second frame coupled to the first frame so as to be movable in a first direction with respect to the first frame;
a roller rotatably coupled to the second frame;
a flexible display unit divided, by being rolled around the roller, into a front portion located on a front surface of the body and a rear portion located on a rear surface of the body, and configured to output an image on one surface thereof;
a support frame coupled to another surface of the flexible display unit and comprising a flexible rack gear formed on another surface of the support frame; and
an auxiliary driving unit transferring a force to the flexible rack gear in a direction in which a size of an area of the flexible display unit that is located on the rear surface increases,
wherein the auxiliary driving unit comprises:
a pinion gear formed on an outer circumferential surface of the roller and rotating by being meshed with the flexible rack gear;
wherein the roller comprises:
a first portion, on which the pinion gear is located;

a second portion in a shape of a pipe having a hollow formed therein; and a first fastening portion, which is formed in the hollow, placed at an end of the first portion, and exposed outside, and wherein the auxiliary driving unit comprises an elastic part having one end thereof coupled to the first fastening portion and having a remaining end thereof coupled to a second fastening portion provided on the second frame.

13. The mobile terminal according to claim 12, wherein the second fastening portion has one side thereof coupled to the remaining end of the elastic part and located in the hollow in the second portion, and another side thereof fastened to the second frame using a screw.

14. The mobile terminal according to claim 12, wherein the elastic part is a coil spring.

15. The mobile terminal according to claim 12, wherein the roller further comprises an opening, which is formed in an outer circumferential surface of the second portion and exposes the first fastening portion.

16. The mobile terminal according to claim 12, wherein the second portion is provided on each of opposite sides of the first portion.

* * * * *